United States Patent [19]

Okajima et al.

[11] Patent Number: 5,629,645

[45] Date of Patent: May 13, 1997

[54] TRANSMISSION-LINE-VOLTAGE CONTROL CIRCUIT AND ELECTRONIC DEVICE INCLUDING THE CONTROL CIRCUIT

[75] Inventors: Yoshinori Okajima; Kazuyuki Kanazashi, both of Kawasaki, Japan

[73] Assignee: Fujitsu Limited, Kawasaki, Japan

[21] Appl. No.: 403,945

[22] Filed: Mar. 14, 1995

[30] Foreign Application Priority Data

May 13, 1994 [JP] Japan ................................. 6-099990

[51] Int. Cl.$^6$ ............................................. H03K 19/094
[52] U.S. Cl. ............................ 327/399; 327/86; 327/87; 327/56
[58] Field of Search .............................. 326/85, 86, 87, 326/91, 56, 17; 327/112, 374, 399, 401, 403, 404, 55, 51, 77, 78, 202, 185, 215, 94, 97; 365/227, 230.08

[56] References Cited

U.S. PATENT DOCUMENTS

| | | | |
|---|---|---|---|
| 4,408,135 | 10/1983 | Yuyama et al. | 326/87 |
| 4,731,553 | 3/1988 | Van Lehn et al. | 307/443 |
| 4,779,013 | 10/1988 | Tanaka | 327/374 |
| 4,988,893 | 1/1991 | Bonneau et al. | 327/218 |
| 5,061,864 | 10/1991 | Rogers | 326/17 |
| 5,166,555 | 11/1992 | Kano | 326/87 |
| 5,189,319 | 2/1993 | Fung et al. | 326/86 |
| 5,237,213 | 8/1993 | Tanoi | 307/290 |
| 5,281,865 | 1/1994 | Yamashita et al. | 326/56 |
| 5,389,834 | 2/1995 | Kinugasa et al. | 326/87 |
| 5,486,782 | 1/1996 | Chan | 327/112 |
| 5,497,115 | 3/1996 | Millar et al. | 327/215 |

Primary Examiner—Timothy P. Callahan
Assistant Examiner—Jung Ho Kim
Attorney, Agent, or Firm—Armstrong, Westerman, Hattori, McLeland & Naughton

[57] ABSTRACT

A transmission-line-voltage control circuit for controlling a level of a transmission line is disclosed. A signal of a first level indicating a logic high and a signal of a second level indicating a logic low are supplied to the transmission line. The transmission-line voltage control circuit includes a circuit connected to the transmission line. This circuit reduces, after the signal of the first level is supplied to the transmission line, the level of the transmission line to a third level which indicates the logic high and is less than the first level. And also the circuit increases, after the signal of the second level is supplied to the transmission line, the level of the transmission line to a fourth level which indicates the logic low and is higher than the second level.

20 Claims, 22 Drawing Sheets

DATA-OUTPUT CIRCUIT 65

DATA-INPUT CIRCUIT 71

TRANSMISSION-LINE-VOLTAGE CONTROL CIRCUIT AND ELECTRONIC DEVICE INCLUDING THE CONTROL CIRCUIT

BACKGROUND OF THE INVENTION

1. Field of the Invention

The present invention generally relates to a transmission-line-voltage control circuit and an electronic device including the control circuit, and more particularly, to a transmission-line-voltage control circuit which controls a voltage level of a signal passing through a transmission line of an electronic device.

2. Description of the Prior Art

FIG. 1 shows a schematic diagram of an example of a conventional electronic device in which signals are transmitted through a transmission line such as a bus line.

The electronic device comprises a central processing unit (CPU) 1, and synchronous dynamic random-access memories (SDRAMs) 2 to 5, but in FIG. 1, only portions of each of the CPU 1 and the SDRAMs 2 to 5, namely data-output circuits 16 to 20 and data-input circuits 21 to 25, are illustrated. Each of output ports of the data-output circuits 16 to 20 and one each of input ports of the data-input circuits 21 to 25 are connected together to a respective one of data-input/output ports 6 to 10 of each of the CPU 1 and the SDRAMs 2 to 5. And the data-input/output ports 6 to 10 are respectively connected to a bus line 26 through respective stubs 27 to 31 of the bus line 26. Through the bus line 26, data DQ is transmitted, and is input to or output from the CPU 1 and the SDRAMs 2 to 5.

The electronic device further comprises a reference-voltage line 34 supplying a reference voltage Vref. The reference-voltage line 34 is connected to each of the other input ports of the data-input circuits 21 to 25 through respective reference-voltage input ports 11 to 15 of the CPU 1 and the SDRAMs 2 to 5. The data DQ input to the data-input circuits 21 to 25 is logically decided by comparing a voltage level of the data DQ with the reference voltage Vref.

Further, both end parts 35, 36 of the bus line 26 are terminated to the reference-voltage line 34 through terminating resistances 32, 33.

Next, a description will be given of a operation of the electronic device. In the electronic device, when the data DQ produced in the CPU 1 is transmitted to the SDRAM 2, the data DQ is output to the bus line 26 from the data-output circuit 16 through the data-input/output port 6 and the stub 27, and then the data DQ in the bus line 26 is input to the data-input circuit 22 of the SDRAM 2 through the stub 28 and the data-input/output port 7.

In general, when a signal waveform of the data DQ is transmitted through the bus line 26, a reflected signal waveform occurs at the end parts 35, 36 of the bus line 26, and the reflected signal waveform causes the main signal waveform of the data DQ to be distorted. However, in this electronic device, because the end parts 35, 36 of the bus line 26 are terminated by the terminating resistances 32, 33, a distortion of the signal waveform of the data DQ due to a reflection at the end parts 35, 36 may be reduced.

However, for example, when the data DQ produced in the CPU 1 is transmitted to the SDRAMs 2 to 5, the output ports of the data-output circuits 17 to 20 of the SDRAMs 2 to 5 are left in a high-impedance condition. In this condition, the output ports of the data-output circuits 17 to 20 are electrically in an open condition. Therefore, the signal waveform of the data DQ is reflected at respective opened output ports. A distortion of the signal waveform of the data DQ due to the reflection at the output ports of the data-output circuits 17 to 20 is relatively large compared to the distortion at the end parts 35, 36 which are terminated.

FIG. 2 shows a signal waveform of the data DQ passing through the bus line 26 in the conventional electronic device. In this drawing, as one example, it is shown that a level of the data DQ in the bus line 26 transits from a low level to a high level. In FIG. 2, a solid line 38 indicates the signal waveform of the data DQ in an ideal case of no reflection, a dotted line 39 indicates the signal waveform thereof in a case of a maximum acceptable reflection.

In this example, an ideal voltage level of the high level $V_{OH}$ is (Vref+0.6 V), and an ideal voltage level of the low level $V_{OL}$ is (Vref−0.6 V). And a high-level-side threshold level $V_{IH}$ is (Vref+0.1 V), and a low-level-side threshold level $V_{IL}$ is (Vref−0.1 V). In the data-input circuits 21 to 25, when the voltage level of the data DQ is in a value from $V_{IH}$ to $V_{OH}$, the data DQ is logically decided to be the high level, whereas when the voltage level of the data DQ is in a value from $V_{IL}$ to $V_{OL}$, the data DQ is logically decided to be the low level. A level range from $V_{IL}$ to $V_{IH}$ is a gray zone, in which an error decision may occur.

In this case, if acceptable margins of $V_{OH}$, $V_{OL}$, $V_{IH}$ and $V_{IL}$ are not taken into account, a maximum acceptable reflection ratio is represented as $(V_{OH}-V_{IH})/(V_{OH}-V_{OL})=$ ((Vref+0.6 V)−(Vref+0.1 V))/((Vref+0.6 V)−(Vref−0.6 V))= 0.5 V/1.2 V=0.42. If the acceptable margins are taken into account, the maximum acceptable reflection ratio is further less than 0.42.

This result reveals that in this electronic device, a maximum reflection ratio at any port such as an output port of the data-output circuits 17 to 20 must be reduced to less than 0.42.

To reduce such a reflection, there is a method of connecting the terminating resistance at each end part in the SDRAM side of the stubs 27 to 31 which are connected to the respective output ports of the data-output circuits 16 to 20. In this method, because there is no opened end in a data transmission line, a distortion of the signal waveform of the data DQ due to the reflection may be negligibly reduced.

However, in this method, a load to be driven by the data-output circuits 16 to 20 becomes relatively small, so that a large driving ability is required of the data-output circuits 16 to 20. Thus, there is a problem that a size and a power consumption of such a data-output circuit are increased.

As mentioned above, it is found that it is difficult to directly reduce the reflection in the data transmission line by the terminating.

The electronic device shown in FIG. 1 has another problem. In a standby mode in which no data is supplied to the bus line, if the output ports of the data-output circuits 16 to 20 are left in the high-impedance condition to reduce the power consumption, a voltage level of the bus line 26 becomes uncertain. In this case, the data-input circuits 21 to 25 may not be regularly operative due to noise.

In this electronic device, to prevent this irregular operation of the data-input circuits 21 to 25, one of the data-output circuits 16 to 20, for example, the data-output circuit 16, may be activated to produce, for example, the low level, as the data DQ, during the standby mode. However, there is also a problem that the power consumption in the standby mode is increased.

SUMMARY OF THE INVENTION

It is an object of this invention to provide a transmission-line-voltage control circuit, connected to a data transmission line of another electronic device, which increases a maximum acceptable reflection ratio of the data transmission line and increases an acceptable range of an input/output data level, and to provide an electronic device including such a transmission-line-voltage control circuit, in which the disadvantages described above are eliminated.

A more specific object of the present invention is to increase flexibility of a circuit design in a circuit mounting base.

A more specific object of the present invention is to reduce a power consumption of the electronic device in a standby mode.

The object described above is achieved by a transmission-line-voltage control circuit for controlling a level of a transmission line, a signal of a first level indicating a logic high and a signal of a second level indicating a logic low being supplied to the transmission line, the transmission-line voltage control circuit comprising: a circuit, connected to the transmission line, for reducing, after the signal of the first level is supplied to the transmission line, the level of the transmission line to a third level which indicates the logic high and is less than the first level, and for increasing, after the signal of the second level is supplied to the transmission line, the level of the transmission line to a fourth level which indicates the logic low and is higher than the second level.

The circuit of the transmission-line-voltage control circuit mentioned above comprises a latch circuit, connected to the transmission line, for latching the level of the transmission line. The latch circuit may comprise a first inverter circuit and a second inverter circuit which are connected in a form of a ring, a connection part between an input of the first inverter circuit and an output of the second inverter circuit being connected to the transmission line.

The object described above is also achieved by an electronic device for controlling a level of a transmission line, a signal of a first level indicating a logic high and a signal of a second level indicating a logic low being supplied to the transmission line, the electronic device comprising: at least one electronic circuit supplying or receiving signals to or from the transmission line; and a transmission-line-voltage control circuit for reducing, after the signal of the first level is supplied to the transmission line, the level of the transmission line to a third level which indicates the logic high and is less than the first level, and for increasing, after the signal of the second level is supplied to the transmission line, the level of the transmission line to a fourth level which indicates the logic low and is higher than the second level.

The object described above is also achieved by an electronic device for supplying a signal of a first level indicating a logic high and a signal of a second level indicating a logic low to a transmission line, the electronic device comprising: means for reducing, after supplying the signal of the first level to the transmission line, a level of the transmission line to a third level which indicates the logic high and is less than the first level, and for increasing, after supplying the signal of the second level to the transmission line, the level of the transmission line to a fourth level which indicates the logic low and is higher than the second level.

The object described above is also achieved by the electronic device mentioned above, wherein the means comprises: a pull-up circuit reducing, after supplying the signal of the first level to the transmission line, a current supplied to the transmission line; and a pull-down circuit reducing, after supplying the signal of the second level to the transmission line, a current drawn from the transmission line.

The object described above is also achieved by an electronic device comprising: a transmission line transmitting signals; at least one signal-output circuit supplying a signal of a first level indicating a logic high and a signal of a second level indicating a logic low to the transmission line; at least one signal-input circuit receiving the signal of the first level and the signal of the second level from the transmission line; and a transmission-line-voltage control circuit, connected to the transmission line, for reducing, after the signal of the first level is supplied to the transmission line, a level of the transmission line to a third level which indicates the logic high and is less than the first level, and for increasing, after the signal of the second level is supplied to the transmission line, the level of the transmission line to a fourth level which indicates the logic low and is higher than the second level.

The object described above is also achieved by an electronic device comprising: a transmission line transmitting signals; at least one signal-output circuit supplying a signal of a first level indicating a logic high and a signal of a second level indicating a logic low to the transmission line, the signal-output circuit including a transmission-line-voltage control circuit, connected to the transmission line, for reducing, after the signal of the first level is supplied to the transmission line, a level of the transmission line to a third level which indicates the logic high and is less than the first level, and for increasing, after the signal of the second level is supplied to the transmission line, the level of the transmission line to a fourth level which indicates the logic low and is higher than the second level; and at least one signal-input circuit receiving the signal of the first level and the signal of the second level from the transmission line.

The object described above is also achieved by an electronic device comprising: a transmission line transmitting signals; at least one signal-output circuit supplying a signal of a first level indicating a logic high and a signal of a second level indicating a logic low to the transmission line; and at least one signal-input circuit receiving the signal of the first level and the signal of the second level from the transmission line, the signal-input circuit including a transmission-line-voltage control circuit, connected to the transmission line, for reducing, after the signal of the first level is supplied to the transmission line, a level of the transmission line to a third level which indicates the logic high and is less than the first level, and for increasing, after the signal of the second level is supplied to the transmission line, the level of the transmission line to a fourth level which indicates the logic low and is higher than the second level.

The object described above is also achieved by an electronic device comprising: a transmission line transmitting signals; at least one signal-output circuit supplying a signal of a first level indicating a logic high and a signal of a second level indicating a logic low to a transmission line, the signal-output circuit including means for reducing, after supplying the signal of the first level to the transmission line, a level of the transmission line to a third level which indicates the logic high and is less than the first level, and for increasing, after supplying the signal of the second level to the transmission line, the level of the transmission line to a fourth level which indicates the logic low and is higher than the second level; and at least one signal-input circuit receiving the signal of the first level and the signal of the second level from the transmission line.

According to the transmission-line-voltage control circuit, when a high-level signal of the first level indicating the logic high is supplied to the transmission line, the transmission-line-voltage control circuit reduces, after a given period, a supplied voltage to the transmission line to the third level which is less than the first level but may be decided to be the logic high. A reduced level is maintained until a new signal having the first level or the second level from the signal-output circuit is supplied to the transmission line.

On the other hand, when a low-level signal of the second level indicating the logic low is supplied to the transmission line, the transmission-line-voltage control circuit increases, after a given period, a supplied voltage to the transmission line to the fourth level which is higher than the second level but may be decided to be the logic low. An increased level is maintained until the new signal having the first level or the second level from the signal-output circuit is supplied to the transmission line.

In this way, when a transition of a transmission signal starts by the signal-output circuit supplying the transmission signal, an initial voltage of the transition is preset to a voltage close to a threshold level of the signal-input circuit. Therefore, a transition range necessary for the transition can be reduced, thus a maximum acceptable reflection ratio may be increased. As a result, an acceptable range of an input/output data level may be increased. This advantage makes it possible to increase flexibility of a circuit design, especially a bus-line design, in a circuit mounting base.

Furthermore, in a standby mode in which no signal is supplied to the transmission line, the signal-input circuit may not be regularly operative due to noise. To prevent this irregular operation of the signal-input circuit, in the standby mode, the transmission-line-voltage control circuit reduces the level of the transmission line to the third level less than the first level for the logic high, or increases the level of the transmission line to the fourth level higher than the second level for the logic low. Therefore, in the standby mode, a smaller amount of current is supplied to the transmission line, or is derived from the transmission line. Thus, power consumption during the standby mode may be reduced.

And according to the electronic device, the transmission-line-voltage control circuit may be included inside the signal-output circuit or the signal-input circuit. The transmission-line-voltage control circuit may control the level of a signal which is supplied from the electronic device itself or by another electronic device connected to the transmission line.

Further according to the electronic device, the signal-output circuit of the electronic device may include the means having the same function as that of the transmission-line-voltage control circuit. This signal-output circuit may control the level of the signal which is produced by itself and supplied to the transmission line.

Other objects and further features of the present invention will be apparent from the following detailed description when read in conjunction with the accompanying drawings.

DESCRIPTION OF THE PREFERRED EMBODIMENTS

Figure 3:
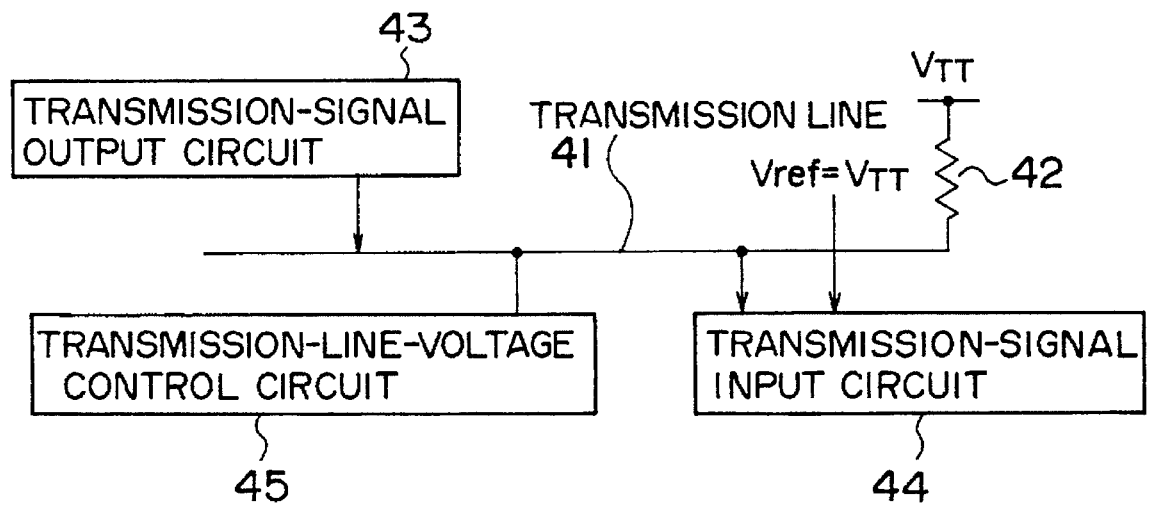
FIG. 3 shows a block diagram of an electronic device including a transmission-line-voltage control circuit according to the present invention.
Figure 4:
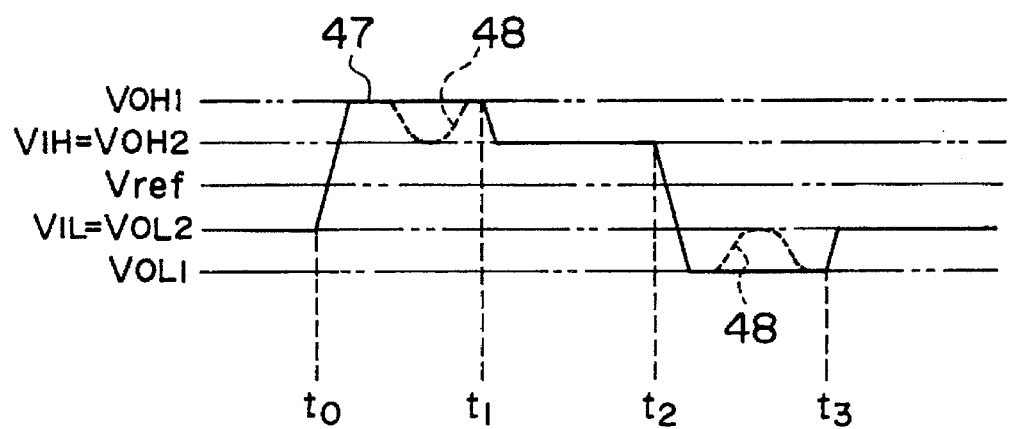
FIG. 4 shows a waveform of a transmission signal in a transmission line, which is controlled by the transmission-line-voltage control circuit.

First, a description will be given of an operation principle of a transmission-line-voltage control circuit according to the present invention, by referring to FIGS. 3 and 4. FIG. 3 shows a block diagram of an electronic device including the transmission-line-voltage control circuit according to the present invention.

The electronic device comprises at least one transmission-signal output circuit 43, at least one transmission-signal input circuit 44, and at least one transmission-line-voltage control circuit 45. These circuits 43, 44, 45 are respectively connected to a transmission line 41 whose end part is terminated by a terminating resistance 42.

The transmission-signal output circuit 43 produces a transmission signal which is supplied to the transmission line 41, the transmission signal being a high-level signal of a voltage $V_{OH1}$ which may be decided to be a logic high, or a low-level signal of a voltage $V_{OL1}$ which may be decided to be a logic low.

The transmission-signal input circuit 44 receives the transmission signal which has been produced from the transmission-signal output circuit 43 and supplied to the transmission line 41. In the transmission-signal input circuit 44, a received transmission signal is compared with a reference voltage which may be a termination voltage $V_{TT}$, and a logic level of the received transmission signal is decided.

A description will be given of the operation principle of the transmission-line-voltage control circuit 45 by referring to FIG. 4. FIG. 4 shows a waveform of a transmission signal in the transmission line 41, which is controlled by the transmission-line-voltage control circuit 45. At an instant $t_0$, a transmission-signal level in the transmission line 41 is transited to the logic high, and at an instant $t_2$, is transited to the logic low. In FIG. 4, a solid line 47 indicates an ideal case in which there is no reflection, and a dotted line 48 indicates a case in which there is reflection.

In further detail, at the instant $t_0$, the high-level signal of $V_{OH1}$ from the transmission-signal output circuit 43 is supplied to the transmission line 41. After a given period, and at an instant $t_1$, the transmission-line-voltage control circuit 45 reduces a voltage of the transmission signal to $V_{OH2}$ which is less than $V_{OH1}$ but may be decided to be the logic high. A reduced level $V_{OH2}$ is maintained until a next signal from the transmission-signal output circuit 43 is supplied to the transmission line 41. At $t_2$, the low-level signal of $V_{OL1}$ from the transmission-signal output circuit 43 is supplied to the transmission line 41. After a given period, and at an instant $t_3$, the transmission-line-voltage control circuit 45 increases the voltage of the transmission signal to $V_{OL2}$ which is higher than $V_{OL1}$ but may be decided to be the logic low. A risen level $V_{OL2}$ is maintained until a new signal having the voltage $V_{OH1}$ or $V_{OL1}$ from the transmission-signal output circuit 43 is supplied to the transmission line 41. In this case, before the instant $t_0$, the voltage of the transmission signal is maintained at $V_{OL2}$ by the transmission-line-voltage control circuit 45.

In this way, when the high-level signal of $V_{OH1}$ from the transmission-signal output circuit 43 is supplied to the transmission line 41, the transmission-line-voltage control circuit 45 reduces, after the given period, the supplied voltage in the transmission line 41 to $V_{OH2}$ which is less than $V_{OH1}$ but may be decided to be the logic high. The reduced level $V_{OH2}$ is maintained until a new signal having the voltage $V_{OH1}$ or $V_{OL1}$ from the transmission-signal output circuit 43 is supplied to the transmission line 41. On the other hand, when the low-level signal of $V_{OL1}$ from the transmission-signal output circuit 43 is supplied to the transmission line 41, the transmission-line-voltage control circuit 45 increases, after the given period, the supplied voltage in the transmission line 41 to $V_{OL2}$ which is higher than $V_{OL1}$ but may be decided to be the logic low. The risen level $V_{OL2}$ is maintained until the new signal having the voltage $V_{OH1}$ or $V_{OL1}$ from the transmission-signal output circuit 43 is supplied to the transmission line 41.

In this electronic device, by connecting such a transmission-line-voltage control circuit 45, a maximum acceptable reflection ratio may be increased as follows. When the reflection in the transmission line occurs, the transmission signal is distorted as shown by the dotted line 48. The maximum acceptable reflection ratio can be obtained on an assumption that the voltage $V_{OH2}$ is a threshold level $V_{IH}$ in a high level side of the transmission-signal input circuit 44, and the voltage $V_{OL2}$ is a threshold level $V_{IL}$ in a low level side of the transmission-signal input circuit 44.

First, in a case that the voltage of the transmission signal is transited from the logic low to the logic high, the maximum acceptable reflection ratio will be discussed.

In a conventional electronic device having no transmission-line-voltage control circuit 45, the transmission signal may transit from the voltage $V_{OL1}$ to the voltage $V_{OH1}$, and a maximum acceptable reflection may be $(V_{OH1}-V_{OH2})$. Therefore, the maximum acceptable reflection ratio is determined by $(V_{OH1}-V_{OH2})/(V_{OH1}-V_{OL1})$.

On the other hand, in the electronic device having the transmission-line-voltage control circuit 45 in FIG. 3, the transmission signal may transit from the voltage $V_{OL2}$ to the voltage $V_{OH1}$, and the maximum acceptable reflection may be $(V_{OH1}-V_{OH2})$. Therefore, the maximum acceptable reflection ratio of this electronic device is determined by $(V_{OH1}-V_{OH2})/(V_{OH1}-V_{OL2})$.

Comparing the above two maximum acceptable reflection ratios, since $(V_{OH1}-V_{OL1})>(V_{OH1}-V_{OL2})$, $(V_{OH1}-V_{OH2})/(V_{OH1}-V_{OL1})<(V_{OH1}-V_{OH2})/(V_{OH1}-V_{OH2})/(V_{OH1}-V_{OL2})$. Therefore, the maximum acceptable reflection ratio of the electronic device according to the present invention is larger than that of the conventional electronic device having no transmission-line-voltage control circuit 45.

Next, in a case that the voltage of the transmission signal is transited from the logic high to the logic low, the maximum acceptable reflection ratio will be discussed.

In the conventional electronic device having no transmission-line-voltage control circuit 45, the transmission signal may transit from the voltage $V_{OH1}$ to the voltage $V_{OL1}$, and the maximum acceptable reflection may be $(V_{OL2}-V_{OL1})$. Therefore, the maximum acceptable reflection ratio is determined by $(V_{OL2}-V_{OL1})/(V_{OH1}-V_{OL1})$.

On the other hand, in the electronic device having the transmission-line-voltage control circuit 45 in FIG. 3, the transmission signal may transit from the voltage $V_{OH2}$ to the voltage $V_{OL1}$, and the maximum acceptable reflection may be $(V_{OL2}-V_{OL1})$. Therefore, the maximum acceptable reflection ratio of this electronic device is determined by $(V_{OL2}-V_{OL1})/(V_{OH2}-V_{OL1})$.

Comparing the above two maximum acceptable reflection ratios, since $(V_{OH1}-V_{OL1})>(V_{OH2}-V_{OL1})$ $(V_{OL2}-V_{OL1})/(V_{OH1}-V_{OL1})<(V_{OL2}-V_{OL1})/(V_{OH2}-V_{OL1})$. Therefore, also in this case, the maximum acceptable reflection ratio of the electronic device according to the present invention is larger than that of the conventional electronic device having no transmission-line-voltage control circuit 45.

As described above, in this electronic device including the transmission-line-voltage control circuit 45, when the transition of the transmission signal starts with the transmission-signal output circuit 43 supplying the transmission signal, an initial voltage of the transition is preset to a voltage close to the threshold level of the transmission-signal input circuit 44. Therefore, a transition range necessary for the transition can be reduced, thus the maximum acceptable reflection ratio may be increased.

In the meantime, in a standby mode in which no signal is supplied to the transmission line 41, the transmission-signal input circuit 44 may not be regularly operative due to noise. To prevent this irregular operation of the transmission-signal input circuit 44, at least one transmission-signal output circuit 43 may be activated during the standby mode. At this time, the transmission-line-voltage control circuit 45 is operative as mentioned above. When the high-level signal of $V_{OH1}$ from the transmission-signal output circuit 43 is supplied to the transmission line 41, the transmission-line-voltage control circuit 45, after the given period, reduces the voltage in the transmission line 41 to $V_{OH2}(<V_{OH1})$. And, when the low-level signal of $V_{OL1}$ from the transmission-signal output circuit 43 is supplied to the transmission line 41, the transmission-line-voltage control circuit 45, after the given period, increases the voltage in the transmission line 41 to $V_{OL2}(>V_{OL1})$. Therefore, in the standby mode, a smaller amount of current is supplied to the transmission line 41, or is derived from the transmission line 41. Thus, power consumption during the standby mode may be reduced.

Figure 5:
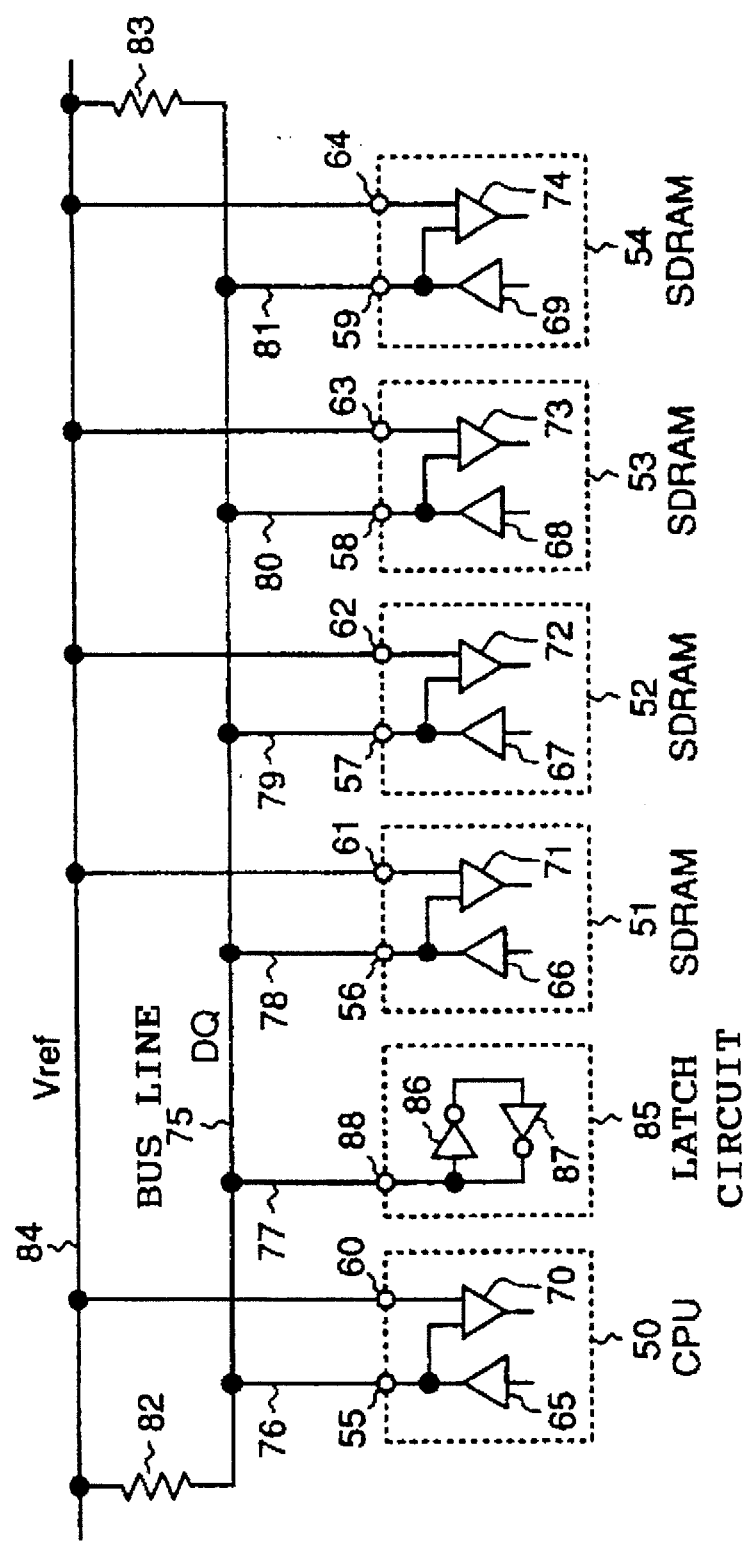
FIG. 5 shows a schematic diagram of a main part of a first embodiment of the electronic device including the transmission-line-voltage control circuit according to the present invention.

Next, descriptions will be given of first to third embodiments of the electronic device including the transmission-line-voltage control circuit according to the present invention, by referring to FIGS. 5 to 23. FIG. 5 shows a schematic diagram of a main part of the first embodiment of the electronic device including the transmission-line-voltage control circuit according to the present invention.

Figure 1:
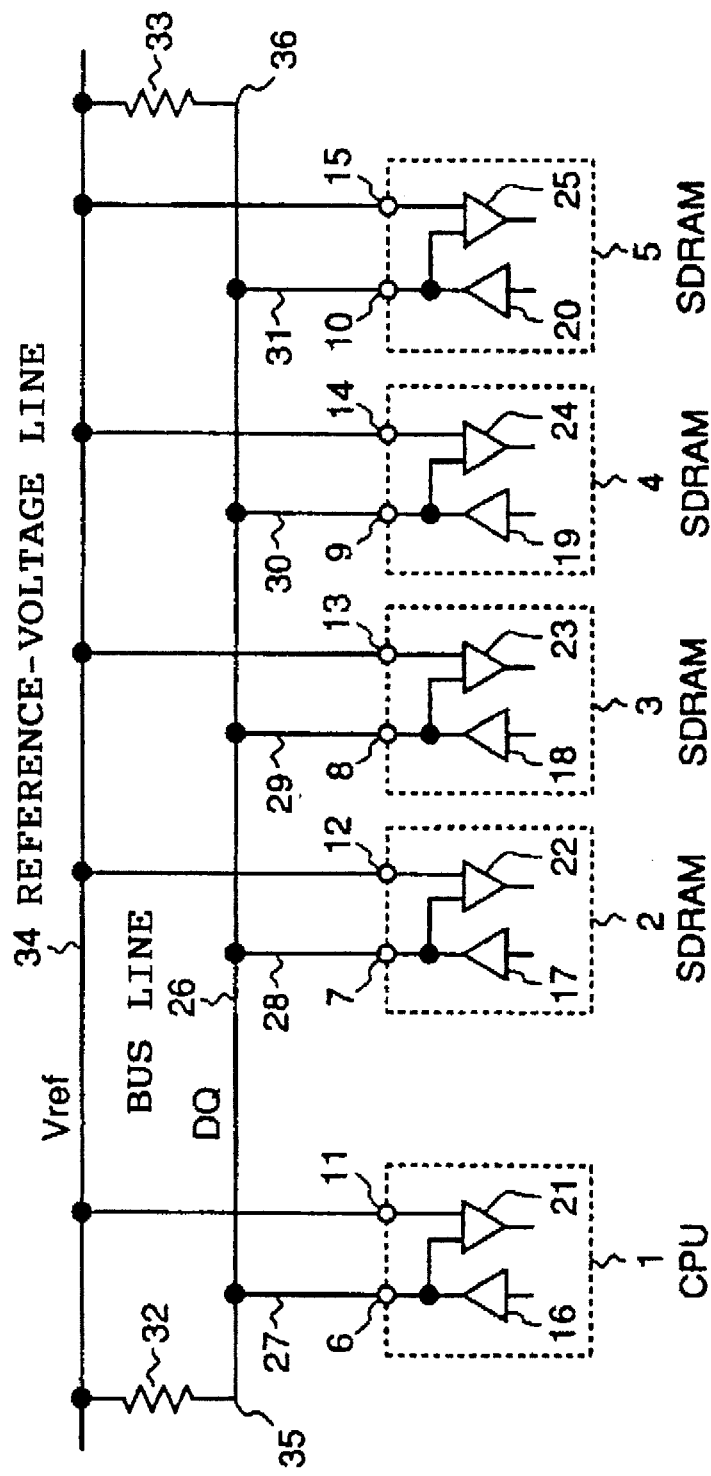
FIG. 1 shows a schematic diagram of a one example of a conventional electronic device in which signals are transmitted through a transmission line such as a bus line.
Figure 2:
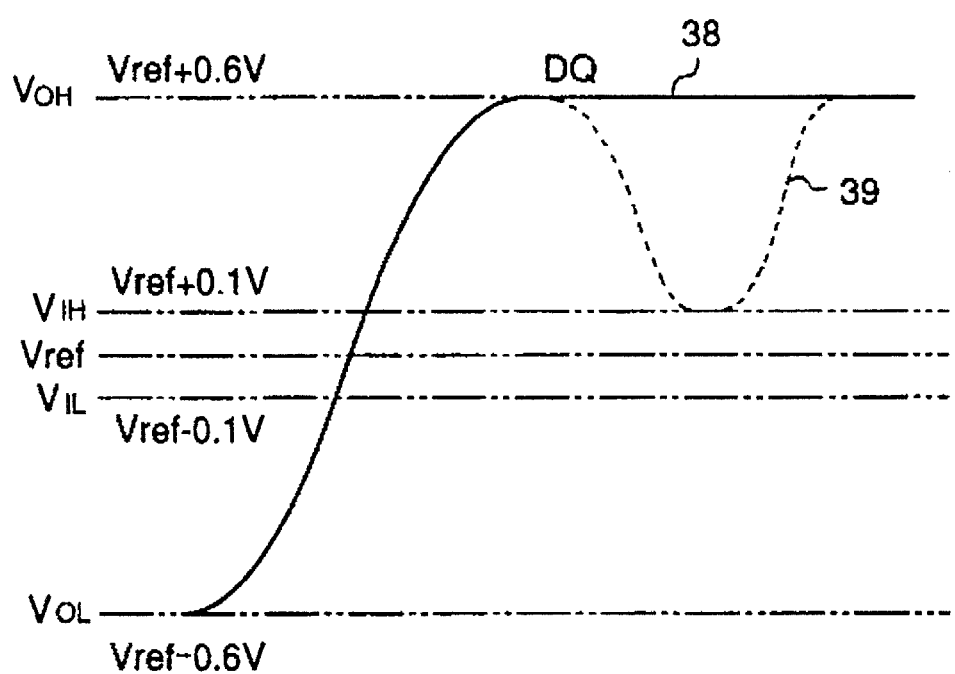
FIG. 2 shows a signal waveform of data DQ passing through the bus line in the conventional electronic device shown in FIG. 1.

In general, this electronic device is fabricated in a circuit mounting base in the same way as the conventional electronic device shown in FIG. 1. The electronic device shown in FIG. 5 comprises a central processing unit (CPU) 50, and synchronous dynamic random-access memories (SDRAMs) 51 to 54, but in FIG. 5, only portions of each of the CPU 50 and the SDRAMs 51 to 54, namely data-output circuits 65 to 69 and data-input circuits 70 to 74, are illustrated. Each of output ports of the data-output circuits 65 to 69 and one each of input ports of the data-input circuits 70 to 74 are connected together to a respective one of data-input/output ports 55 to 59 of each of the CPU 50 and the SDRAMs 51 to 54.

And the data-input/output ports 55 to 59 are respectively connected to a bus line 75 through a respective stub 76, 78 to 81 of the bus line 75. Through the bus line 75, data DQ is transmitted, and is input to or output from the CPU 50 and the SDRAMs 51 to 54.

The electronic device further comprises a reference-voltage line 84 supplying a reference voltage Vref. The reference-voltage line 84 is connected to each of the other input ports of the data-input circuits 70 to 74 through respective reference-voltage-input ports 60 to 64 of the CPU 50 and the SDRAMs 51 to 54. The data DQ input to the data-input circuits 70 to 74 is logically decided by comparing a voltage level of the data DQ with the reference voltage Vref.

Further, both end parts of the bus line 75 are terminated to the reference-voltage line 84 through terminating resistances 82, 83.

A configuration of the electronic device mentioned above is almost the same as that of the conventional electronic device shown in FIG. 1, but the electronic device shown in FIG. 5 further includes a latch circuit 85 which is operative as the transmission-line-voltage control circuit. The latch circuit 85 is constructed with inverters 86, 87 constituting first and second gate circuits connected in a form of flip-flop, and controls a voltage of the bus line 75.

Figure 6:
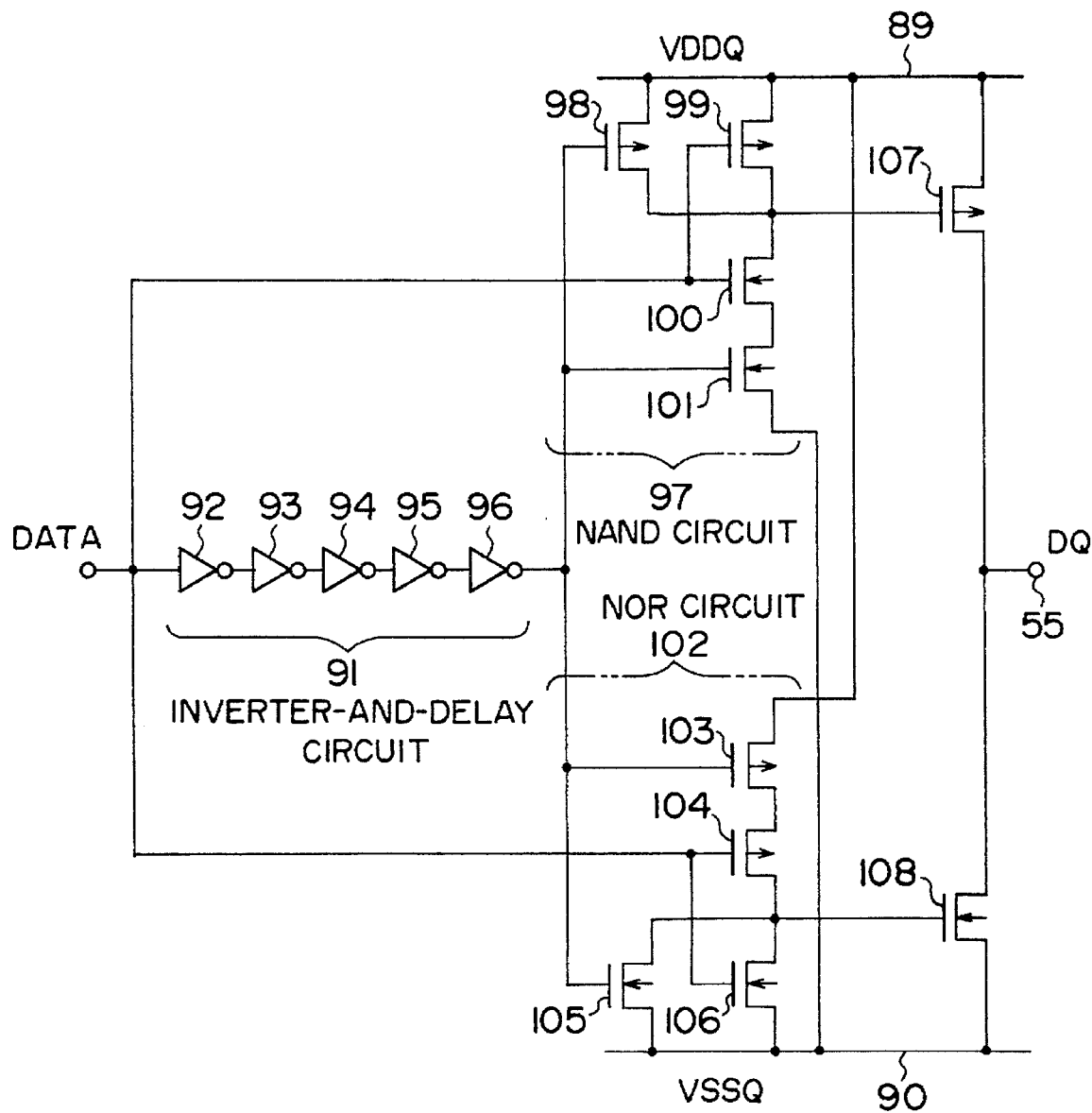
FIG. 6 shows an example of a schematic diagram of a data-output circuit.

The data-output circuits 65 to 69 have the same circuit configuration. FIG. 6 shows an example of a schematic diagram of the data-output circuit 65.

In FIG. 6, this data-output circuit 65 is connected to a power-supply voltage VDDQ line 89 for the high-level signal, and to a power-supply voltage VSSQ line 90 for the low-level signal. The VDDQ line 89 supplies, for example, 3 V, and the VSSQ line 90 supplies, for example, 0 V. Both the VDDQ line 89 and the VSSQ line 90 are used only for the output circuits.

The data-output circuit 65 includes an inverter-and-delay circuit 91, a NAND circuit 97, and a NOR circuit 102. The inverter-and-delay circuit 91 is constructed with inverter circuits 92 to 96. In the inverter-and-delay circuit 91, data DATA produced by an internal circuit (not shown) is inverted and delayed. And an output of the inverter-and-delay circuit 91 is supplied to the NAND circuit 97, and the NOR circuit 102.

The NAND circuit 97 is constructed with P-channel MOS (PMOS) transistors 98, 99, and N-channel MOS (NMOS) transistors 100, 101. In the NAND circuit 97, a NAND operation of the data DATA and the output of the inverter-and-delay circuit 91 is carried out.

The NOR circuit 102 is constructed with PMOS transistors 103, 104, and NMOS transistors 105, 106. In the NOR circuit 102, a NOR operation of the data DATA and the output of the inverter-and-delay circuit 91 is carried out.

The data-output circuit 65 further includes a PMOS transistor 107 for outputting the data with a pull-up operation, and an NMOS transistor 108 for outputting the data with a pull-down operation. The PMOS transistor 107 is controlled to be turned on (conductive) or turned off (non-conductive) based on an output of the NAND circuit 97. The NMOS transistor 108 is controlled to be turned on/off based on an output of the NOR circuit 102.

Figure 7:
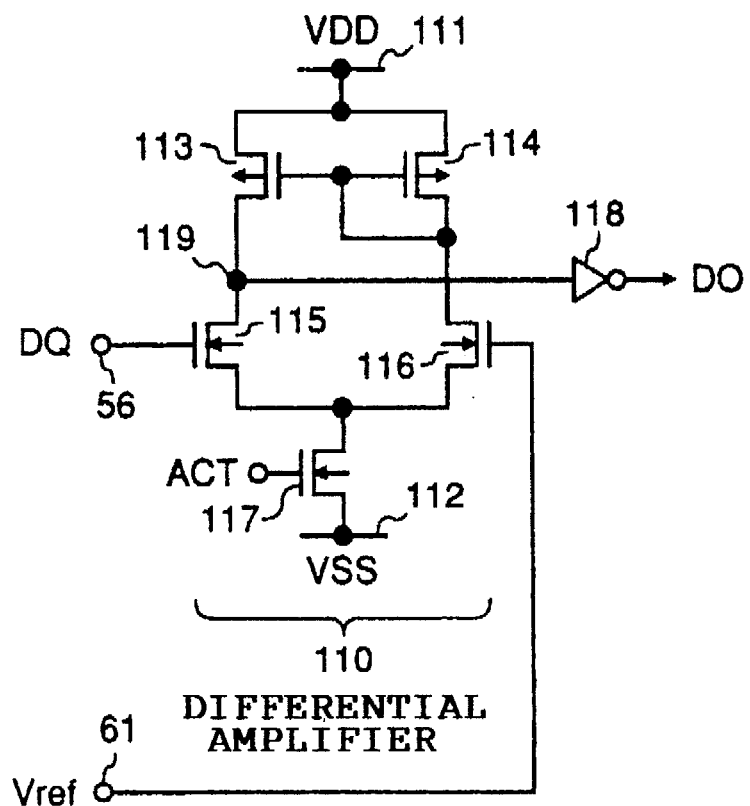
FIG. 7 shows an example of a schematic diagram of a data-input circuit.

The data-input circuits 70 to 74 have the same circuit configuration. FIG. 7 shows an example of a schematic diagram of the data-input circuit 71.

The data-input circuit 71 is constructed with a differential amplifier 110, which is connected to a power-supply voltage VDD line 111 in a high-level side, and to a power-supply voltage VSS line 112 in a low-level side. The VDD line 111 supplies, for example, 3 V, and the VSS line 112 supplies, for example, 0 V.

The differential amplifier 110 includes PMOS transistors 113, 114 forming a current mirror circuit as a load, NMOS transistors 115, 116 forming driving transistors, and an NMOS transistor 117. The NMOS transistor 117 is controlled to be turned on/off based on a differential-amplifier activating signal ACT. And when the NMOS transistor 117 is turned on, the transistor is operative as a resistance.

The data-input circuit 71 further includes an inverter circuit 118 reshaping a signal produced at a node 119. And an output DO of the inverter circuit 118 is supplied to the internal circuit (not shown).

In the data-input circuit 71 mentioned above, the data DQ input to the differential amplifier 110 is compared to a reference level Vref supplied to a node 61. In fact, the threshold level $V_{IH}$ in the high-level side may be set to (Vref+0.1 V), and the threshold level $V_{IL}$ in the low-level side may be set to (Vref−0.1 V), by suitably setting field-effect transistor (FET) parameters.

Figure 8:
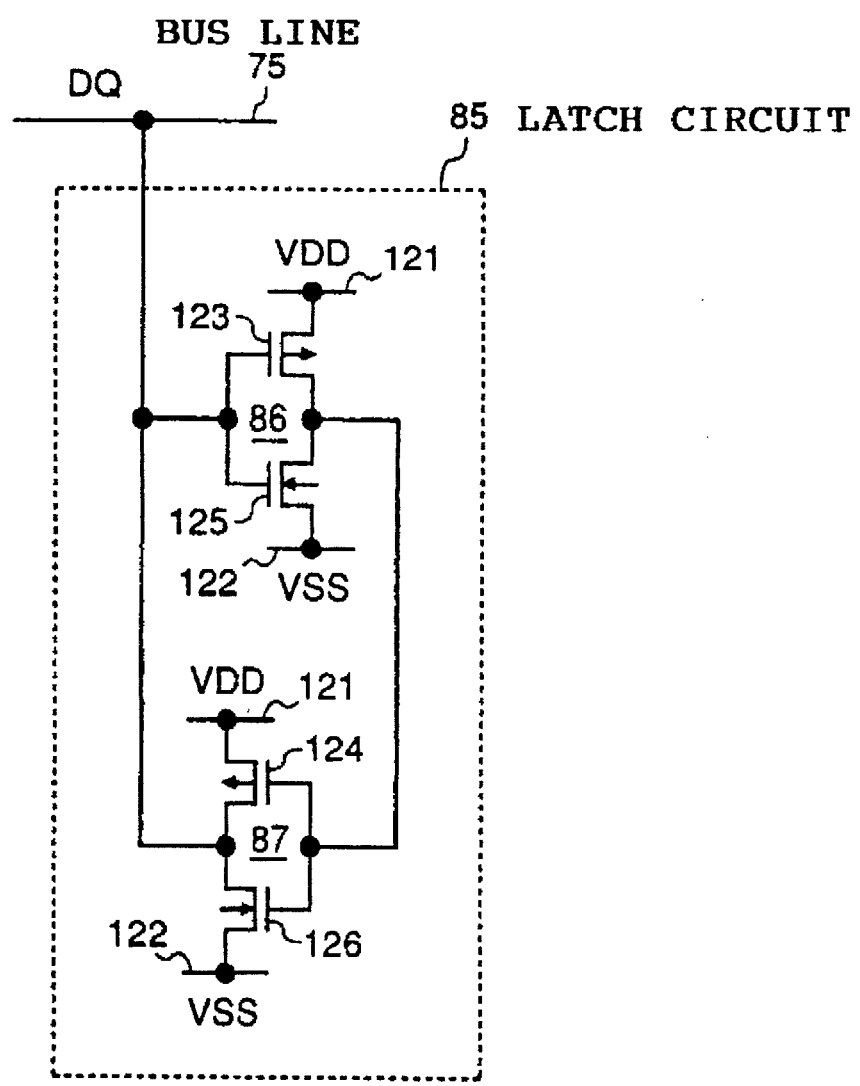
FIG. 8 shows a detail schematic diagram of a latch circuit shown in FIG. 5.

FIG. 8 shows a detail schematic diagram of the latch circuit 85 shown in FIG. 5. As shown in FIG. 8, the latch circuit 85 is constructed with two inverters 86, 87, the inverter 86 including a PMOS transistor 123 and an NMOS transistor 125, and the inverter 87 including a PMOS transistor 124, and an NMOS transistor 126. The PMOS transistor 123 of the inverter 86 is connected to a VDD line 121 supplying a power-supply voltage VDD, and the NMOS transistor 126 of the inverter 87 is connected to a VSS line 122 supplying a power-supply voltage VSS.

Next, a description will be given of an operation of the first embodiment of the electronic device shown in FIG. 5. As shown in FIG. 5, when the data DQ from the CPU 50 is transmitted to the SDRAM 51, the data DQ is output from the data-output circuit 65 to the bus line 75 through the data-input/output port 55 and the stub 76. And then, the data DQ in the bus line 75 is taken to the data-input circuit 71 through the stub 78 and the data-input/output port 56.

Figure 9:
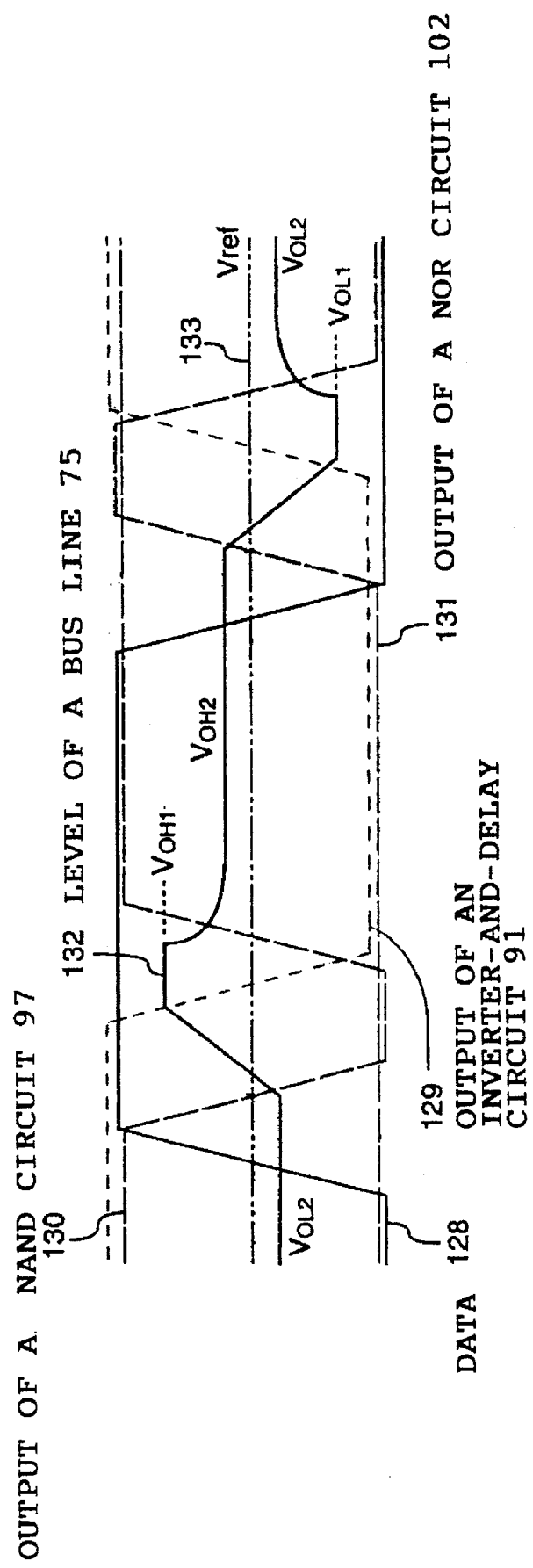
FIG. 9 shows a waveform of the data DQ which is transmitted from a CPU to an SDRAM.

FIG. 9 shows a waveform of data DQ which is transmitted from the CPU 50 to the SDRAM 51. And FIGS. 10 to 14 show schematic diagrams for explaining an operation in a case that the data DQ is transmitted from the CPU 50 to the SDRAM 51 in the first embodiment of the electronic device.

In FIG. 9, a line 128 indicates the data DATA, a line 129 indicates the output of the inverter-and-delay circuit 91, a line 130 indicates the output of the NAND circuit 97, a line 131 indicates the output of the NOR circuit 102, a line 132 indicates a voltage level of the bus line 75, and a line 133 indicates the reference voltage Vref.

Figure 10:
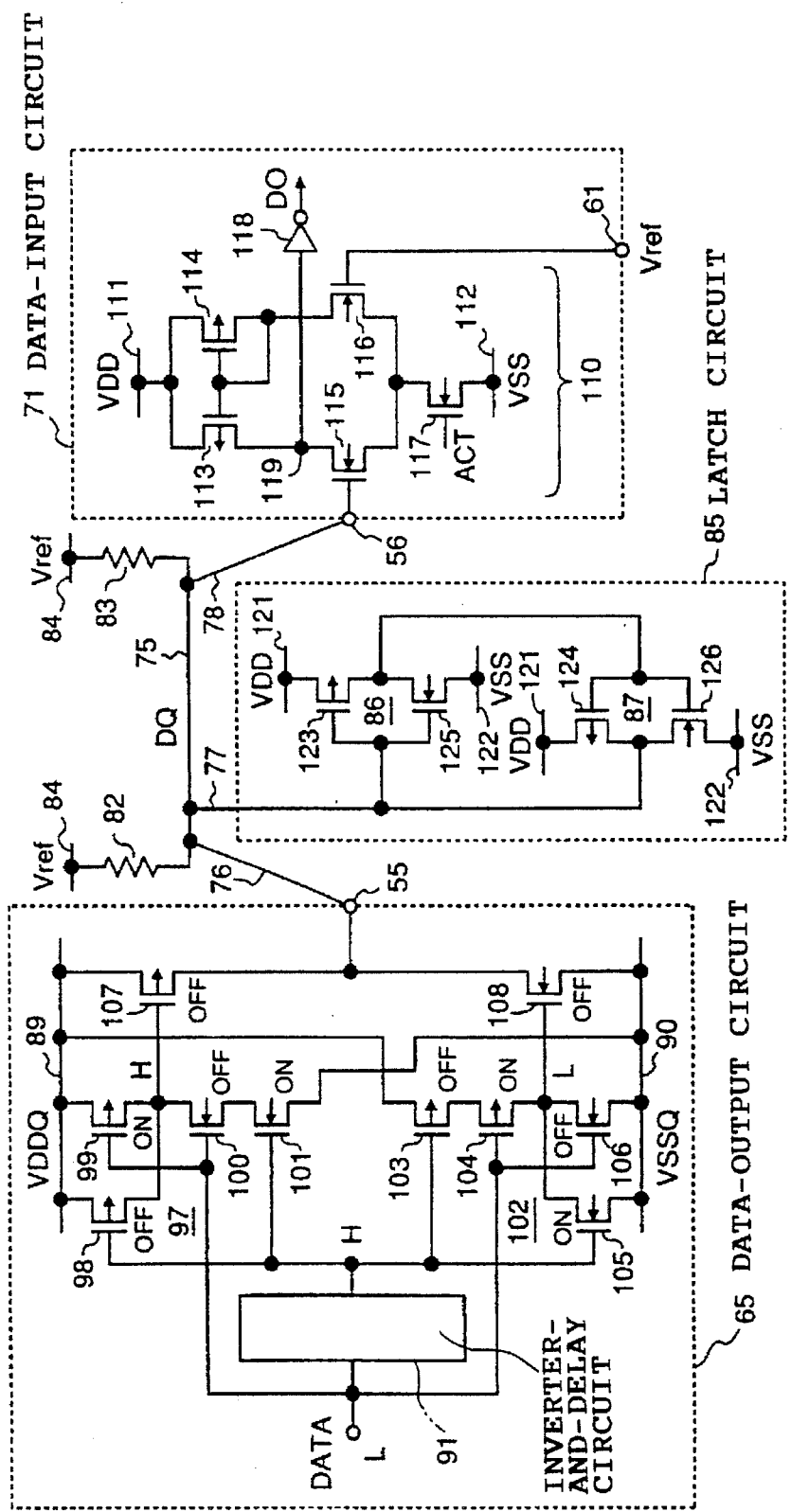
FIGS. 10 to 14 show schematic diagrams for explaining an operation in a case that the data DQ is transmitted from the CPU to the SDRAM in the first embodiment of the electronic device.

In the data-output circuit 65 shown in FIG. 10, if the data DATA is at a low level L which is determined by a logic circuit, the output of the inverter-and-delay circuit 91 is at a high level H which is determined by the logic circuit.

As a result, in the NAND circuit 97, the PMOS transistor 98 is turned off, the PMOS transistor 99 is turned on, the NMOS transistor 100 is turned off, and the NMOS transistor 101 is turned on. Therefore, the output of the NAND circuit 97 is at the high level H, and then the PMOS transistor 107 is turned off.

And, in the NOR circuit 102, the PMOS transistor 103 is turned off, the PMOS transistor 104 is turned on, the NMOS transistor 105 is turned on, and the NMOS transistor 106 is turned off. Therefore, the output of the NOR circuit 102 is at the low level L, and then the NMOS transistor 108 is turned off.

Figure 11:
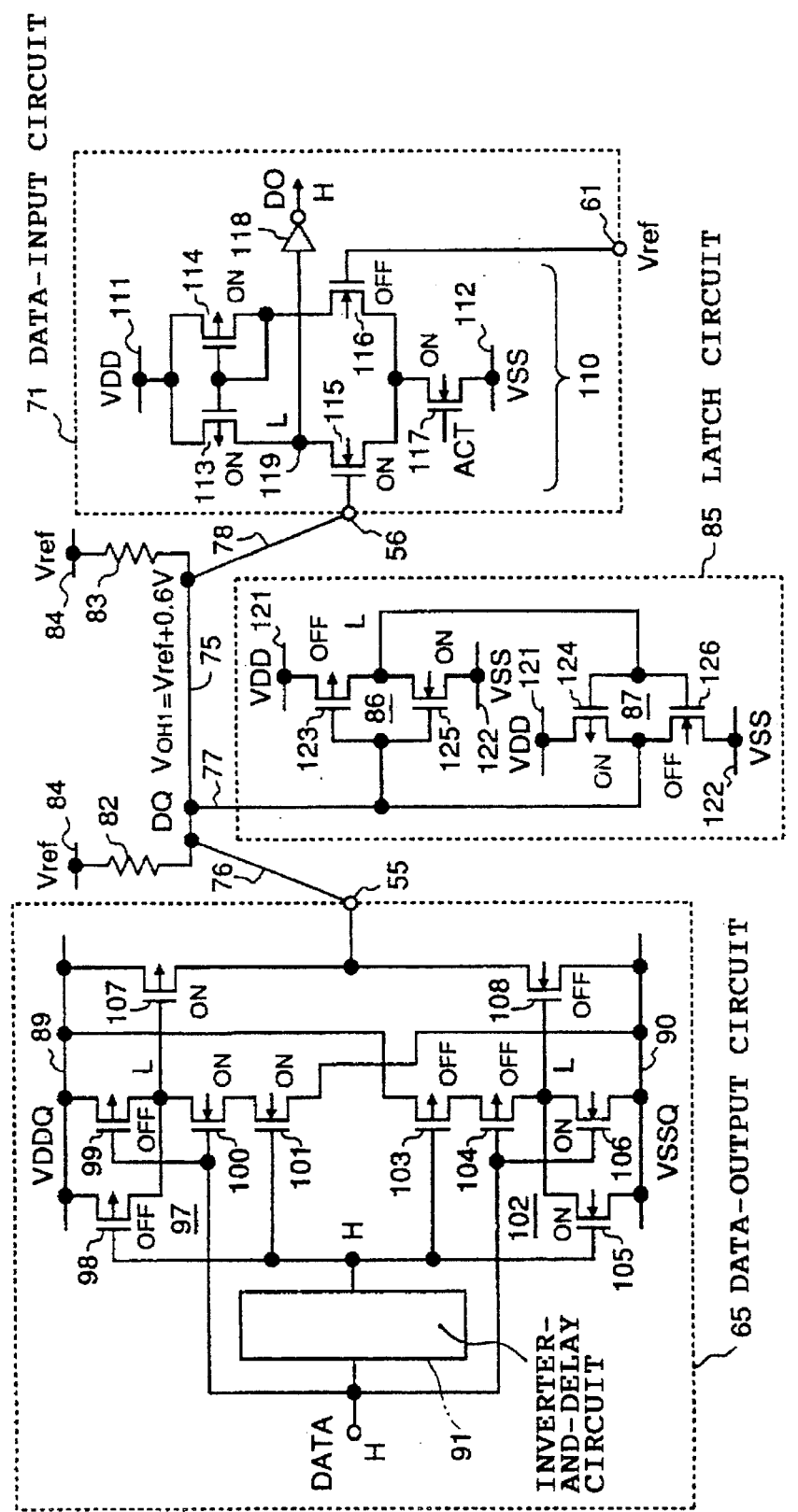

And then, as shown in FIG. 11, if the level of the data DATA becomes the high level H, the output of the inverter-and-delay circuit 91 is maintained at the high level H until a given delay time passes.

As a result, in the NAND circuit 97, the PMOS transistor 99 is turned off, and the NMOS transistor 100 is turned on. Therefore, the output level of the NAND circuit 97 becomes the low level L, and then, the PMOS transistor 107 is turned on.

On the other hand, in the NOR circuit 102, the PMOS transistor 104 is turned off, and the NMOS transistor 106 is turned on. Therefore, the output of the NOR circuit 102 is maintained at the low level L, and then, the NMOS transistor 108 is maintained to be turned off.

In this case, an amount of current is drawn from the VDDQ line 89 of the data-output circuit 65 to the reference voltage line 84 through the PMOS transistor 107, the stub 76, the bus line 75, and the terminating resistances 82, 83.

As a result, the voltage of the bus line 75 transits to a voltage determined by a resistance value of the turned-on PMOS transistor 107 and a combined value of the terminating resistances 82, 83. In this embodiment, the resistance value of the turned-on PMOS transistor 107 is previously set such that the level of the bus line 75 becomes the level $V_{OH1}$ which is decided to be the logic high, for example, (Vref+0.6 V).

In this way, when the voltage of the bus line 75 is increased to (Vref+0.6 V), in the latch circuit 85, the PMOS transistor 123 is turned off, the NMOS transistor 125 is turned on, the PMOS transistor 124 is turned on, and the NMOS transistor 126 is turned off. Thus, the data DQ output from the data-output circuit 65 is latched at the high level H.

In the data-input circuit 71, the NMOS transistors 115, 117 are turned on, the NMOS transistor 116 is turned off, a level of the node 119 is the low level L, and the output DO of the inverter circuit 118 is the high level H. In this way, the data DQ output from the data-output circuit 65, which indicates the high level H, is taken to the data-input circuit 71.

Figure 12:
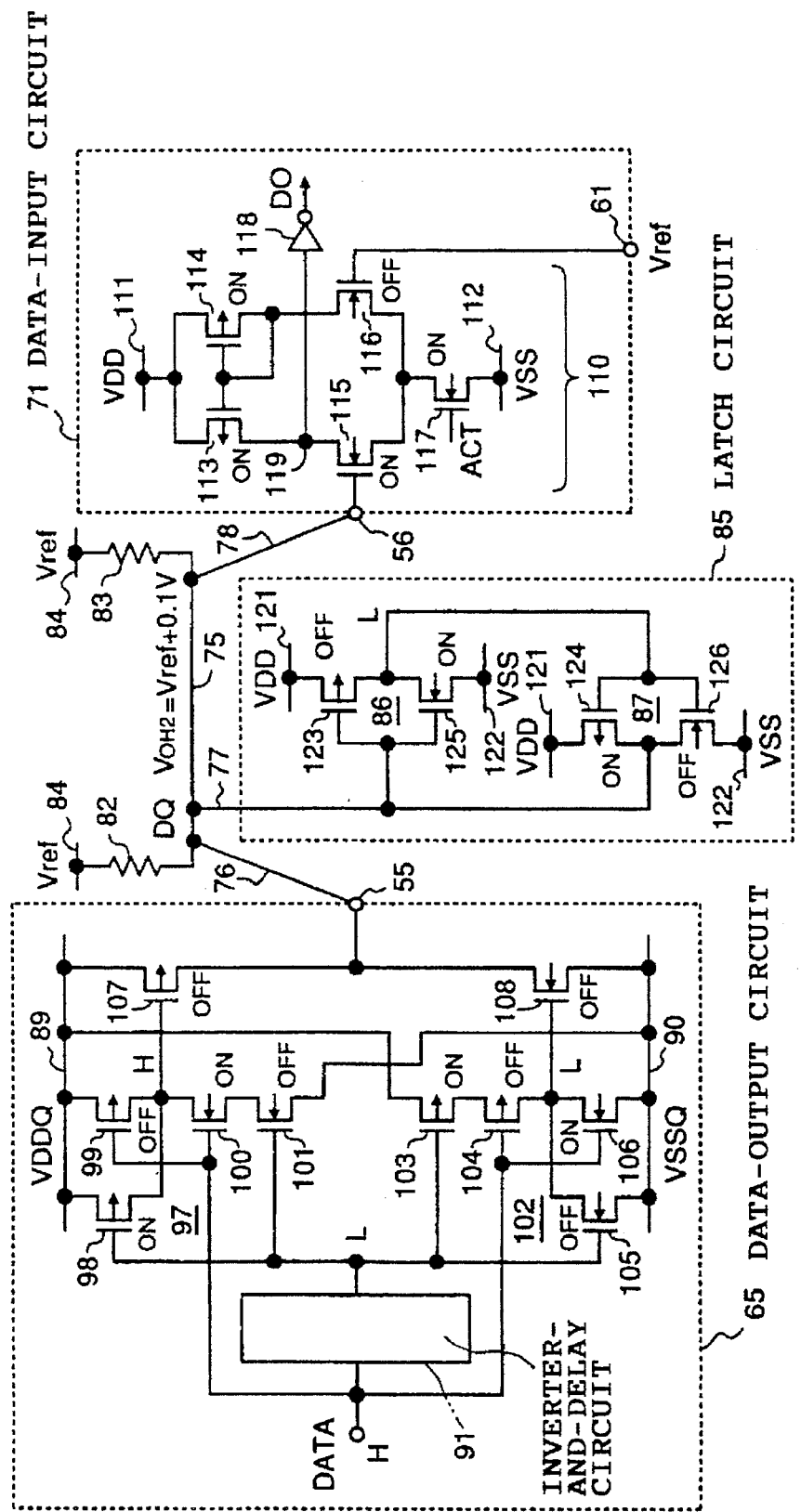

After that, when these circuits are in a standby condition, as shown in FIG. 12, the output level of the inverter-and-delay circuit 91 becomes the low level L. As a result, in the NAND circuit 97, the PMOS transistor 98 is turned on, the NMOS transistor 101 is turned off, the output level of the NAND circuit 97 becomes the high level H, and the PMOS transistor 107 is turned off.

On the other hand, in the NOR circuit 102, the PMOS transistor 103 is turned on, the NMOS transistor 105 is turned off, the output of the NOR circuit 102 is maintained at the low level L, and then, the NMOS transistor 108 is maintained to be turned off. Therefore, an output condition of the data-output circuit 65 is in the high-impedance condition.

In this case, an amount of current is drawn from the VDD power-supply line 121 of the latch circuit 85 to the reference-voltage line 84 through the PMOS transistor 124, the stub 77, the bus line 75 and the terminating resistances 82, 83.

As a result, the voltage of the bus line 75 transits to a voltage determined by a resistance value of the turned-on PMOS transistor 124 and the combined value of the terminating resistances 82, 83. In this embodiment, the resistance value of the turned-on PMOS transistor 124 is previously set such that the level of the bus line 75 becomes the level $V_{OH2}$ which is less than the level $V_{OH1}$, but is decided to be the logic high, for example, (Vref+0.1 V).

In this case, in the data-input circuit 71, the threshold voltage $V_{IH}$ on the high-level side for the input is preset to (Vref+0.1 V), so that an output condition of the data-input circuit 71 does not change.

Figure 13:
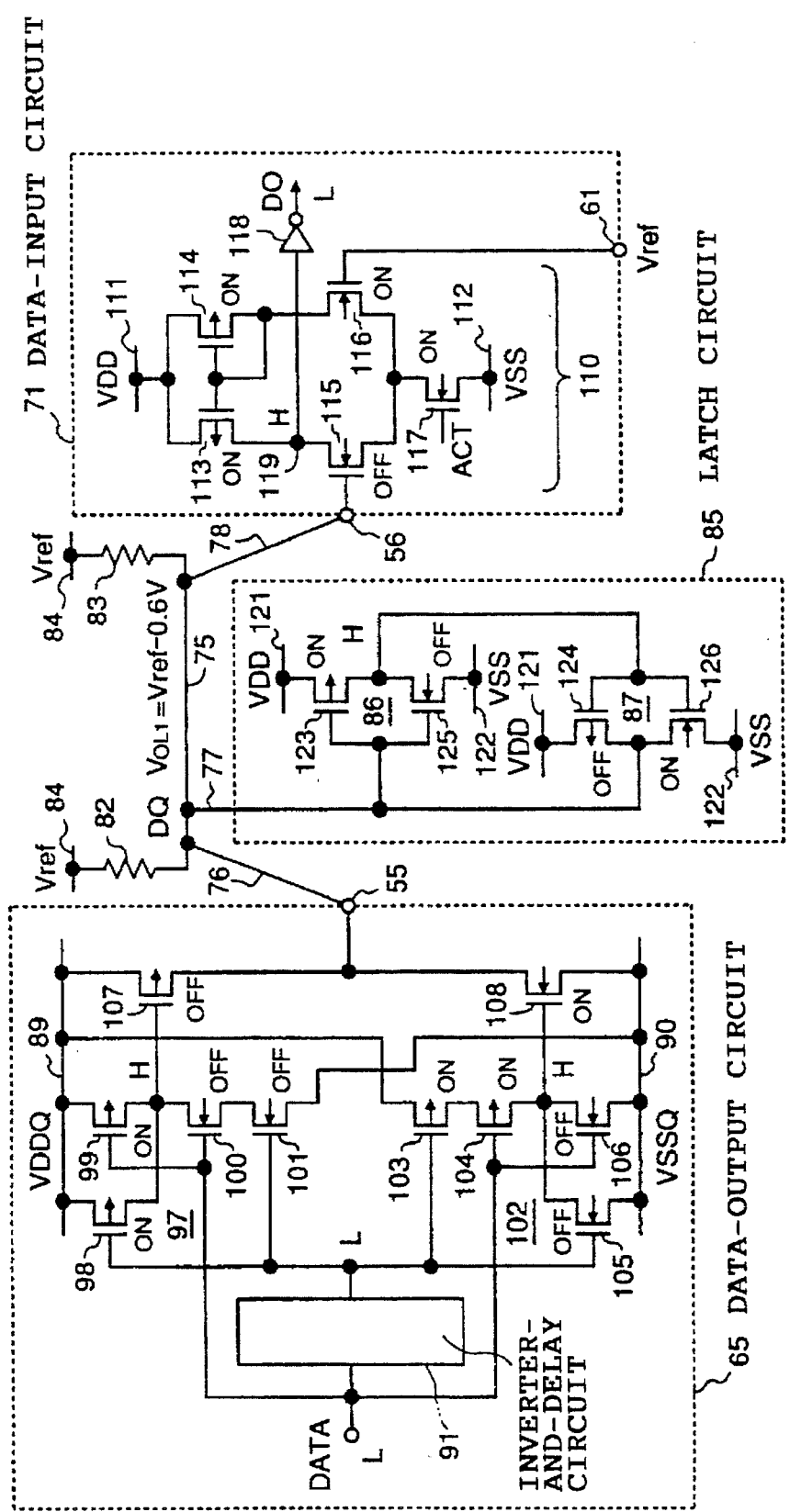

And then, as shown in FIG. 13, if the data DATA becomes the low level L, the output of the inverter-and-delay circuit 91 is maintained at the low level L until the given delay time passes.

As a result, in the NAND circuit 97, the PMOS transistor 99 is turned on, and the NMOS transistor 100 is turned off. Therefore, the output of the NAND circuit 97 is maintained at the high level H, and the PMOS transistor 107 is maintained to be turned off.

On the other hand, in the NOR circuit 102, the PMOS transistor 104 is turned on, and the NMOS transistor 105 is turned off. Therefore, the output of the NOR circuit 102 becomes the high level H, and then, the NMOS transistor 108 is turned on.

In this case, an amount of current is drawn from the reference-voltage line 84 to the VSSQ power-supply line 90 through the terminating resistances 82, 83, the bus line 75, the stub 76, and the NMOS transistor 108.

As a result, the voltage of the bus line 75 transits to a voltage determined by a resistance value of the turned-on NMOS transistor 108 and the combined value of the terminating resistances 82, 83. In this embodiment, the resistance value of the turned-on NMOS transistor 108 is previously set such that the level of the bus line 75 becomes the level $V_{OL1}$ which is decided to be the logic low, for example, (Vref−0.6 V).

In this way, when the voltage of the bus line 75 is decreased to (Vref−0.6 V), in the latch circuit 85, the PMOS transistor 123 is turned on, the NMOS transistor 125 is turned off, the PMOS transistor 124 is turned off, and the NMOS transistor 126 is turned on. Thus, the data DQ output from the data-output circuit 65 is latched at the low level L.

In the data-input circuit 71, the NMOS transistors 116, 117 are turned on, the NMOS transistor 115 is turned off, the level of the node 119 is the high level H, and the output DO of the inverter circuit 118 is at the low level L. In this way, the data DQ output from the data-output circuit 65, which indicates the low level L, is taken to the data-input circuit 71.

Figure 14:
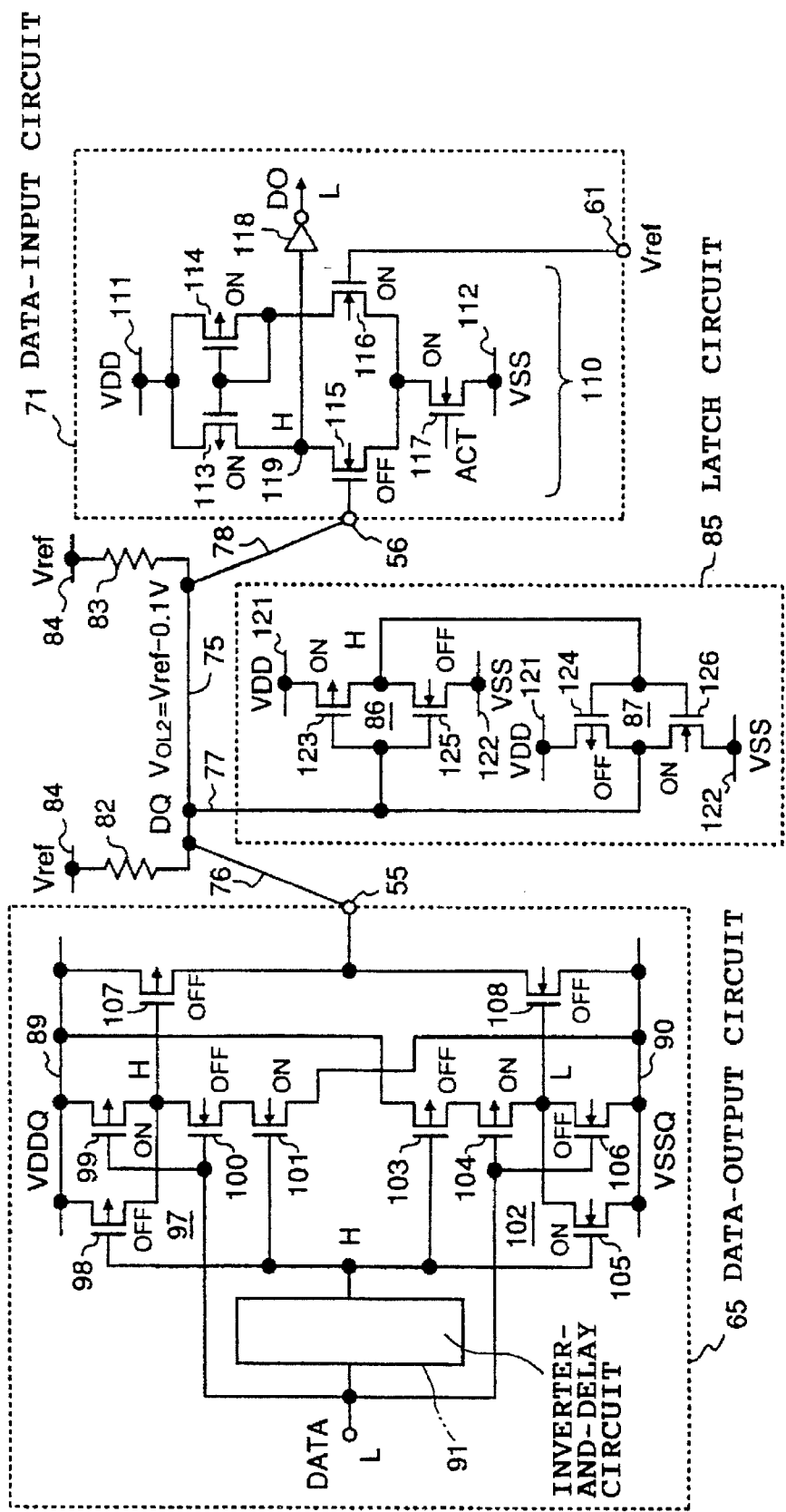

After that, when these circuits are in the standby condition, as shown in FIG. 14, the output level of the inverter-and-delay circuit 91 becomes the high level H. As a result, in the NAND circuit 97, the PMOS transistor 98 is turned off, the NMOS transistor 101 is turned on, the output level of the NAND circuit 97 is maintained at the high level H, and the PMOS transistor 107 is maintained to be turned off.

On the other hand, in the NOR circuit 102, the PMOS transistor 103 is turned off, the NMOS transistor 105 is turned on, the output level of the NOR circuit 102 becomes the low level L, and then, the NMOS transistor 108 is turned off. Therefore, the output condition of the data-output circuit 65 is in the high-impedance condition.

In this case, an amount of current is drawn from the reference-voltage line 84 to the VSS power-supply line 122 through the terminating resistances 82, 83, the bus line 75, the stub 77, and the NMOS transistor 126.

As a result, the voltage of the bus line 75 transits to a voltage determined by a resistance value of the turned-on NMOS transistor 126 and the combined value of the terminating resistances 82, 83. In this embodiment, the resistance value of the turned-on NMOS transistor 126 is previously set such that the level of the bus line 75 becomes the level $V_{OL2}$ which is higher than the level $V_{OL1}$, but is decided to be the logic low, for example, (Vref–0.1 V).

In this case, in the data-input circuit 71, the threshold voltage $V_{IL}$ on the low-level side for the input is preset to (Vref–0.1 V), so that the output condition of the data-input circuit 71 does not change.

Figure 15:
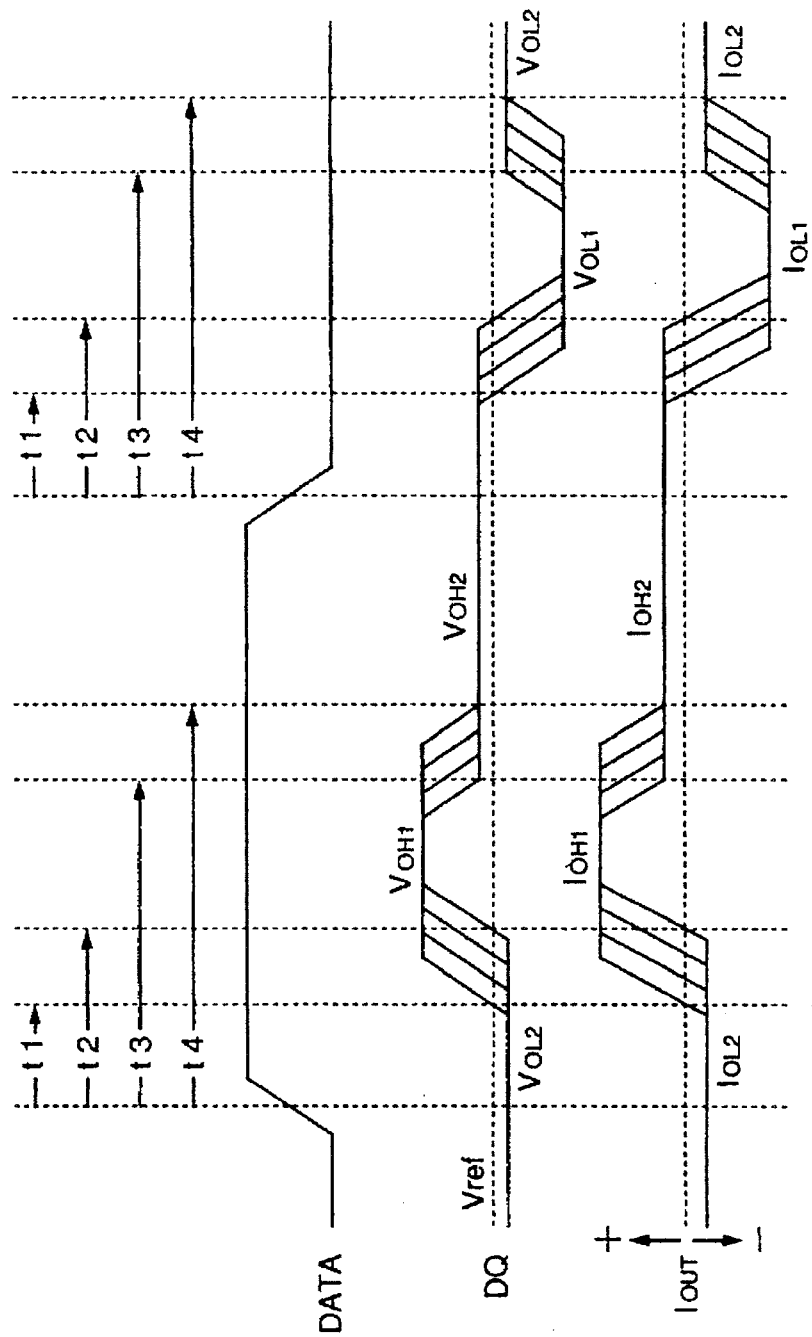
FIG. 15 shows a relationship between data DATA output from an internal circuit, the data DQ output from the data-output circuit, and an output current Iout of the data-output circuit.

FIG. 15 shows a relationship between the data DATA output from the internal circuit, the data DQ output from the data-output circuit 65, and an output current Iout of the data-output circuit 65.

In this drawing, t1 indicates a minimum value of an input-to-output time, t2 indicates a maximum value of the input-to-output time, t3 indicates a minimum value of an output-current deceased time, and t4 indicates a maximum value of the output-current deceased time.

In this embodiment, when the data DQ of the low-level signal is output and the level of the bus line 75 becomes the level $V_{OL1}$(=Vref–0.6 V), in the standby mode after that, the level of the bus line 75 is maintained at the level $V_{OL2}$(= Vref–0.1 V).

And, when the data DQ of the high-level signal is output and the level of the bus line 75 becomes the level $V_{OH1}$(= Vref+0.6 V), in the standby mode after that, the level of the bus line 75 is maintained at the level $V_{OH2}$(=Vref+0.1 V).

As a result, in the first embodiment, when the data DQ of the high-level signal is output, the maximum acceptable reflection ratio is determined by $(V_{OH1}–V_{OH2})/(V_{OH1}–V_{OL2})$=((Vref+0.6 V)–(Vref+0.1 V))/((Vref+0.6 V)–(Vref–0.1 V))=0.5 V/0.7 V =0.71.

On the contrary, in the conventional electronic device shown in FIG. 1, in the standby mode, the level of the bus line 75 is maintained at the level $V_{OH1}$. Therefore, the maximum acceptable reflection ratio is determined by $(V_{OH1}–V_{IH})/(V_{OH1}–V_{OL1})$=((Vref+0.6 V)–(Vref+0.1 V))/((Vref+0.6 V)–(Vref–0.6 V))=0.5 V/1.2 V=0.41.

On the other hand, in the first embodiment, when the data DQ of the low-level signal is output, the maximum acceptable reflection ratio is determined by $(V_{OL2}–V_{OL1})/(V_{OH2}–V_{OL1})$=((Vref–0.1 V)–(Vref–0.6 V))/ ((Vref+0.1 V)–(Vref–0.6 V))=0.5 V/0.7 V =0.71.

On the contrary, in the conventional electronic device shown in FIG. 1, in the standby mode, the level of the bus line 75 is maintained at the level $V_{OH1}$. Therefore, the maximum acceptable reflection ratio is determined by $(V_{IL}–V_{OL1})/(V_{OH1}–V_{OL1})$=((Vref–0.1 V)–(Vref–0.6 V))/((Vref+ 0.6 V)–(Vref–0.6 V))=0.5 V/1.2 V=0.41.

In this way, the first embodiment may have a larger maximum acceptable reflection ratio than that of the conventional electronic device shown in FIG. 1. Therefore, in the electronic device of the first embodiment, a large margin may be taken for an input/output specification, so that the above makes it easy to design the electronic device.

Further, in the first embodiment, in the standby mode, to stabilize the bus line 75, an amount of the current is drawn through the PMOS transistor 124 or the NMOS transistor 126 of the latch circuit 85, but output transistors of the data-output circuits 65 to 69 are left non-conductive. Thus, these output transistors do not draw a current. On the contrary, in the conventional electronic device, in the standby mode, each of the data-output circuits 65 to 69 is operative to draw a current. The current drawn through the PMOS transistor 124 or the NMOS transistor 126 of the latch circuit 85 is less than the current drawn through each of the data-output circuits 65 to 69. Therefore, power consumption of the first embodiment in the standby mode may be reduced compared to that of the conventional electronic device shown in FIG. 1.

Figure 16:
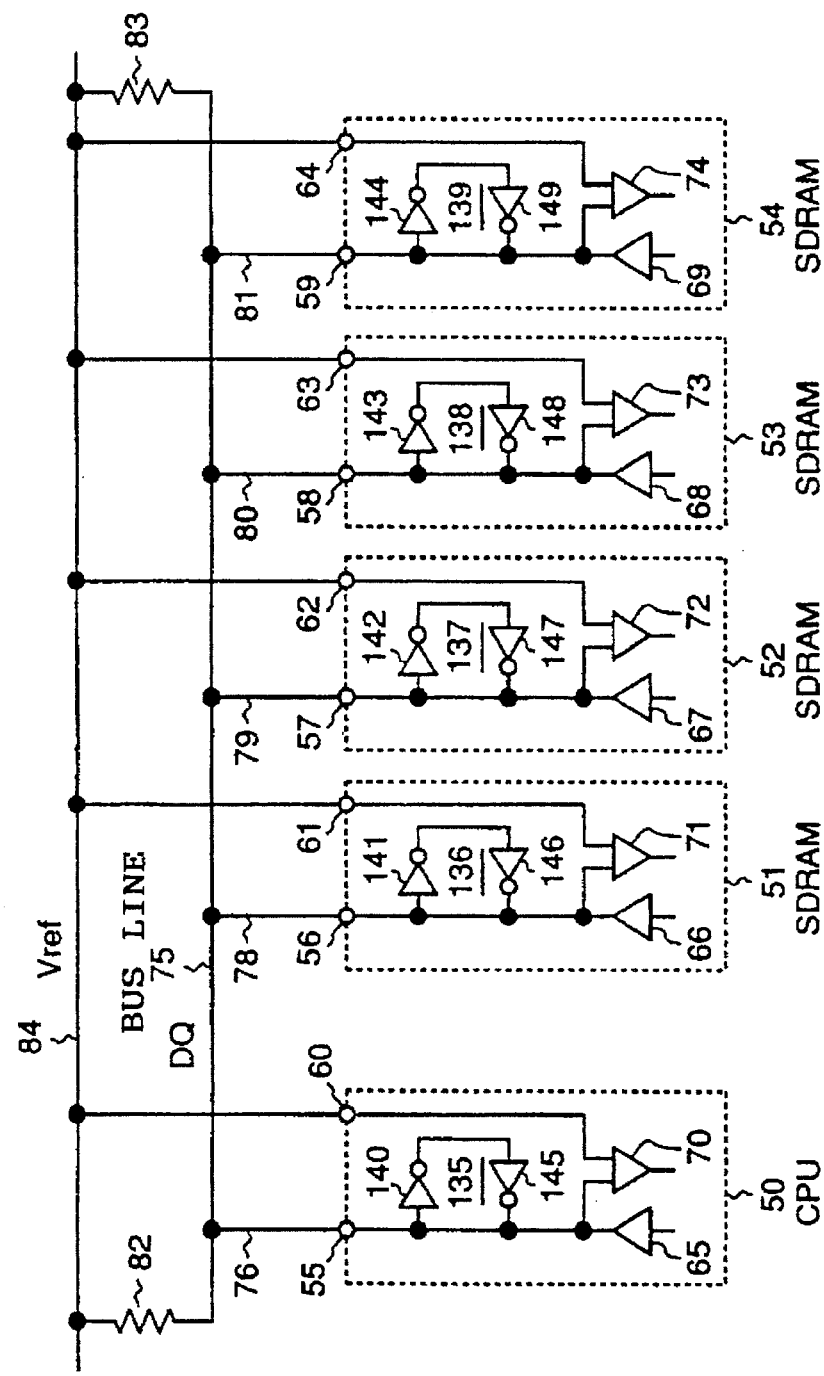
FIG. 16 shows a schematic diagram of a main part of a second embodiment of the electronic device including the transmission-line-voltage control circuits according to the present invention.

Next, a description will be given of the second embodiment of the electronic device including transmission-line-voltage control circuits according to the present invention, by referring to FIG. 16. FIG. 16 shows a schematic diagram of a main part of the second embodiment of the electronic device including the transmission-line-voltage control circuits according to the present invention.

A configuration of the second embodiment of the electronic device is similar to that of the first embodiment shown in FIG. 5. But, in the second embodiment shown in FIG. 16, the latch circuit 85 is not installed, and latch circuits 135 to 139 are installed inside the respective CPU 50 and SDRAMs 51 to 54.

These latch circuits 135 to 139 are constructed with CMOS inverter circuits 140 to 149, and are respectively operative in the same way as the latch circuit 85 shown in FIG. 5.

Therefore, in the same way as the first embodiment, the second embodiment also may have the larger maximum acceptable reflection ratio than that of the conventional electronic device shown in FIG. 1. Therefore, in the electronic device of the second embodiment, the large margin may be taken for an input/output specification, so that the above makes it easy to design the electronic device. Further, the second embodiment of the electronic device may reduce the power consumption in the standby mode compared to that of the conventional electronic device.

Furthermore, in the second embodiment, either a PMOS transistor or an NMOS transistor, constructing each inverter circuit 145 to 149 of the latch circuits 135 to 139, is turned on. The transistor being turned on may be operative as a terminating resistance, so that the transistor makes it possible to reduce the reflection.

Figure 17:
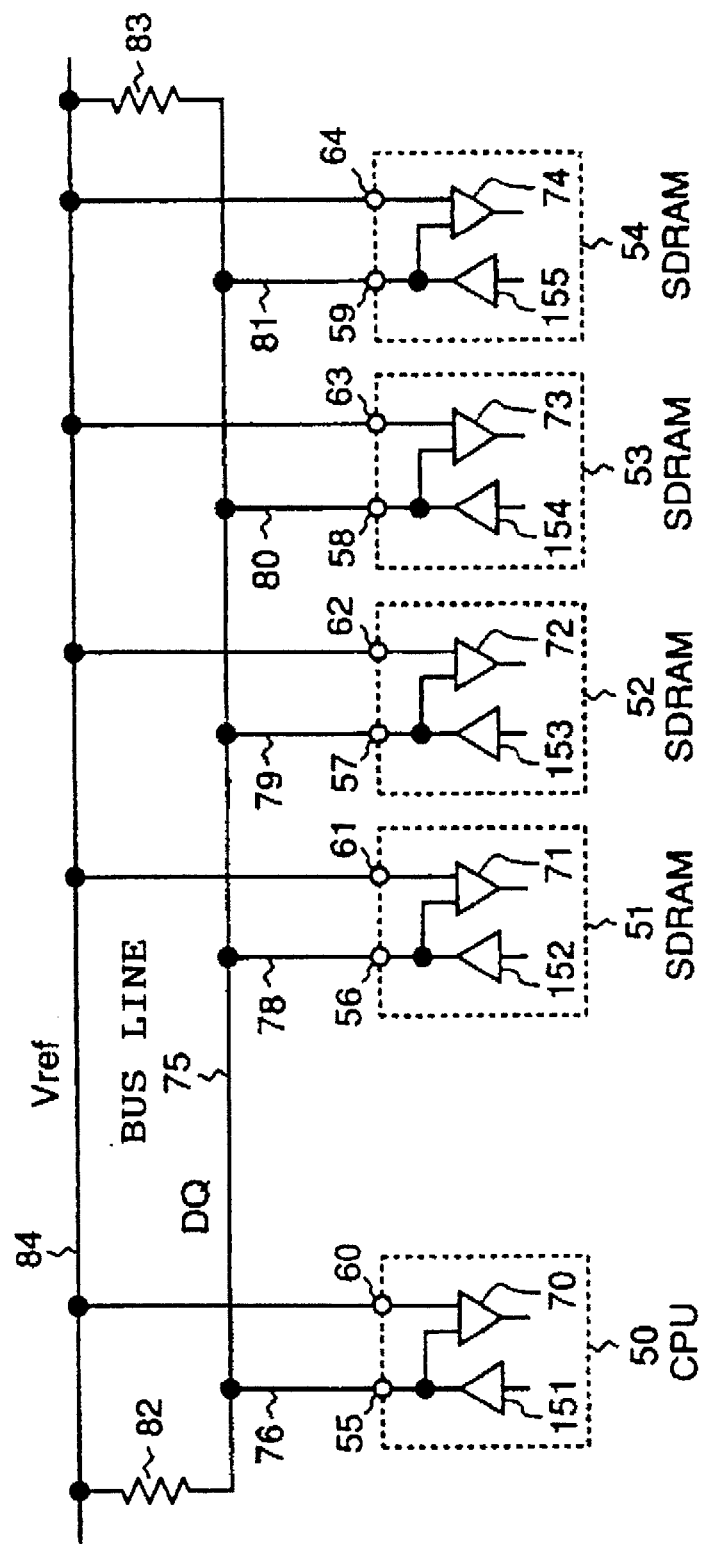
FIG. 17 shows a schematic diagram of a main part of a third embodiment of the electronic device including the transmission-line-voltage control circuits according to the present invention.

Next, a description will be given of the third embodiment of the electronic device including transmission-line-voltage control circuits according to the present invention, by referring to FIGS. 17 to 23. FIG. 17 shows a schematic diagram of a main part of the third embodiment of the electronic device including the transmission-line-voltage control circuits according to the present invention.

A configuration of the third embodiment of the electronic device is similar to that of the first embodiment shown in FIG. 5. But, in the third embodiment shown in FIG. 17, the latch circuit 85 is not installed, and the CPU 50 and the SDRAMs 51 to 54 include data-output circuits 151 to 155, respectively, instead of the data-output circuits 65 to 69. Each of the data-output circuits 151 to 155 is constructed to include a transmission-line-voltage control function such as a latch function, and has the same configuration.

Figure 18:
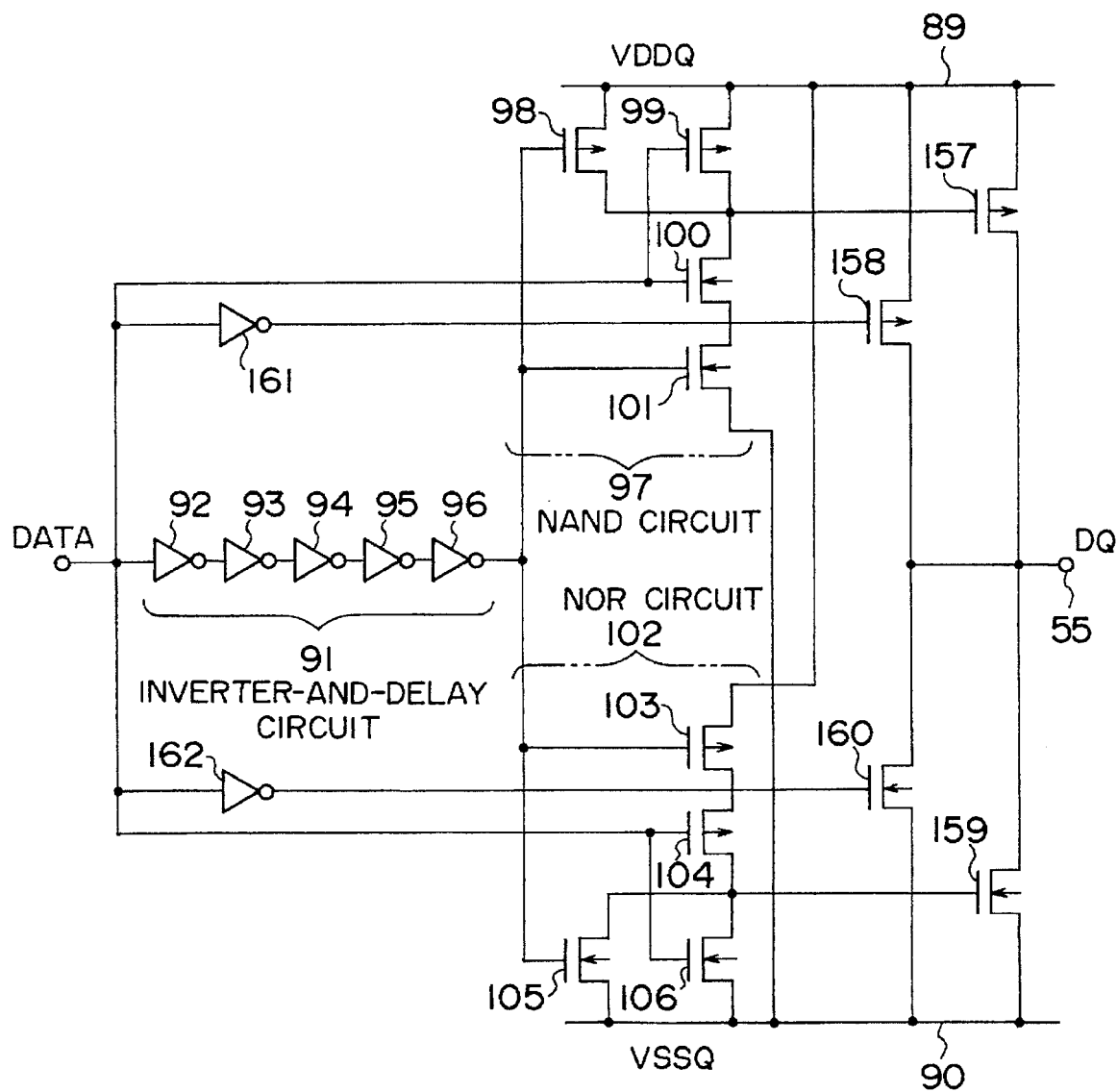
FIG. 18 shows a schematic diagram of a data-output circuit of the third embodiment of the electronic device shown in FIG. 17.

FIG. 18 shows a schematic diagram of the data-output circuit 151.

The data-output circuit 151 is a modification of the data-output circuit 65 shown in FIG. 6. PMOS transistors 157, 158 are formed for outputting the data with the pull-up operation instead of the PMOS transistor 107 shown in FIG. 6, resistance values of the turned-on PMOS transistors 157, 158 being larger than that of the turned-on PMOS transistor 107.

And NMOS transistors 159, 160 are formed for outputting the data with the pull-down operation instead of the NMOS transistor 108, resistance values of the turned-on NMOS transistors 159, 160 being larger than that of the turned-on NMOS transistor 108.

The PMOS transistor 157 is controlled to be turned on/off by the output of the NAND circuit 97, and the PMOS transistor 158 is controlled to be turned on/off by an output of an inverter circuit 161 for inverting the data DATA.

And the NMOS transistor 159 is controlled to be turned on/off by the output of the NOR circuit 102, and the NMOS transistor 160 is controlled to be turned on/off by an output of an inverter circuit 162 for inverting the data DATA.

A residual configuration of the data-output circuit 151 is the same as that of the data-output circuit 65 shown in FIG. 6.

FIGS. 19 to 23 show schematic diagrams for explaining an operation in a case that the data DQ is transmitted from the CPU 50 to the SDRAM 51 in the third embodiment of the electronic device.

Figure 19:
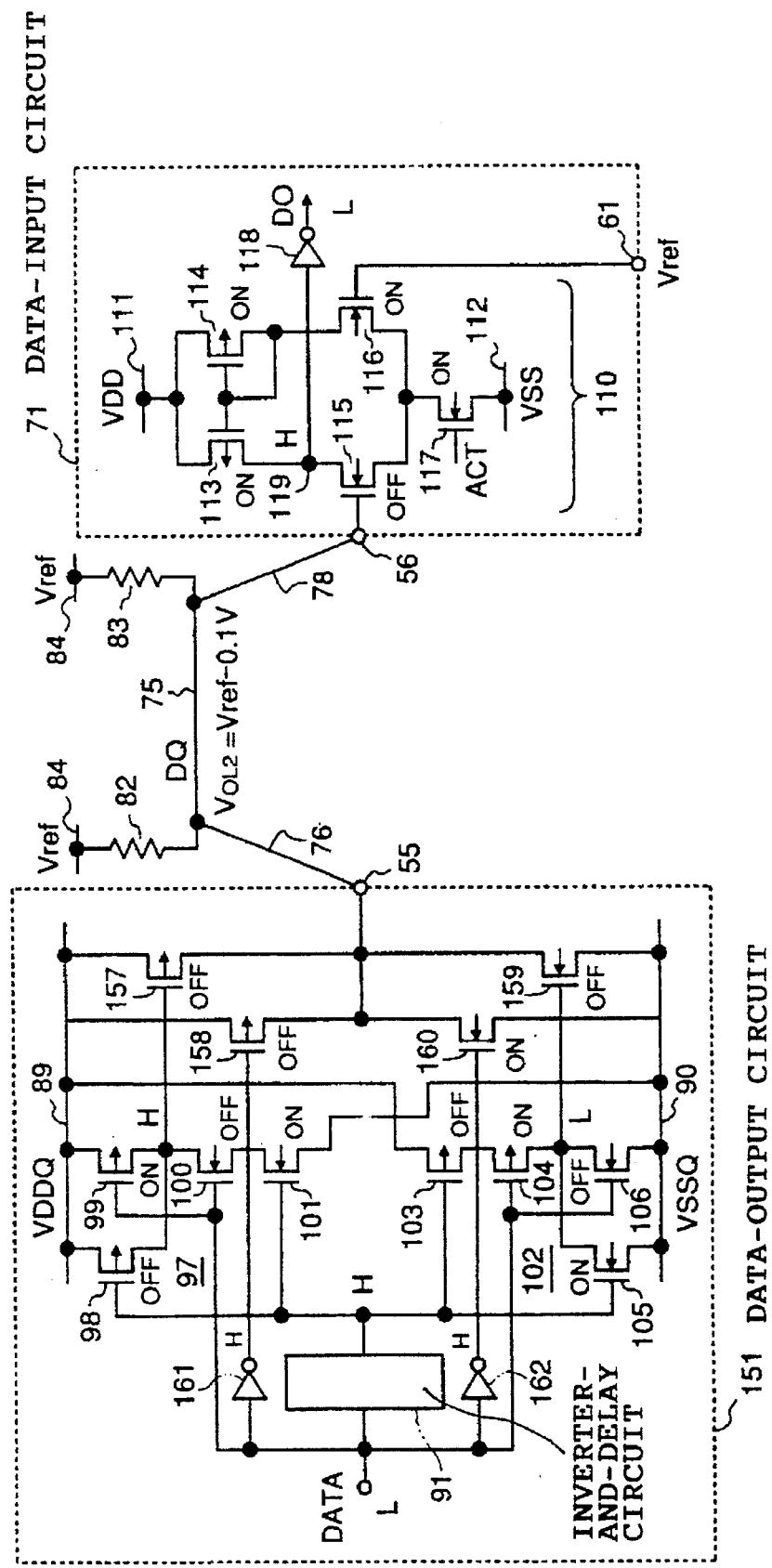
FIGS. 19 to 23 show schematic diagrams for explaining an operation in a case that the data DQ is transmitted from the CPU to the SDRAM in the third embodiment of the electronic device.

In the data-output circuit 151 shown in FIG. 19, if the data DATA is at the low level L, the output of the inverter-and-delay circuit 91 is the high level As a result, in the NAND circuit 97, the PMOS transistor 98 is turned off, the PMOS transistor 99 is turned on, the NMOS transistor 100 is turned off, and the NMOS transistor 101 is turned on. Therefore, the output of the NAND circuit 97 is at the high level H, and then the PMOS transistor 157 is turned off.

In this case, the output of the inverter circuit 161 is at the high level H, and the PMOS transistor 158 is turned off.

And, in the NOR circuit 102, the PMOS transistor 103 is turned off, the PMOS transistor 104 is turned on, the NMOS transistor 105 is turned on, and the NMOS transistor 106 is turned off. Therefore, the output of the NOR circuit 102 is at the low level L, and then the NMOS transistor 159 is turned off.

In this case, the output of the inverter circuit 162 is at the high level H, and the NMOS transistor 160 is turned on.

Therefore, an amount of current is drawn from the reference-voltage line 84 to the VSSQ power-supply line 90 through the terminating resistances 82, 83, the bus line 75, the stub 76, and the NMOS transistor 160.

As a result, the voltage of the bus line 75 transits to a voltage determined by a resistance value of the turned-on NMOS transistor 160 and the combined value of the terminating resistances 82, 83. In the third embodiment, the resistance value of the turned-on NMOS transistor 160 is previously set such that the level of the bus line 75 becomes the level $V_{OL2}$ which is higher than the level $V_{OL1}$, but is decided to be the logic low, for example, (Vref−0.1 V).

In this case, in the data-input circuit 71, the threshold voltage $V_{IL}$ on the low-level side for the input is preset to (Vref−0.1 V). Therefore, the NMOS transistors 116, 117 are turned on, the NMOS transistor 115 is turned off, the level of the node 119 is at the high level H, and the output DO of the inverter circuit 118 is at the low level L.

Figure 20:
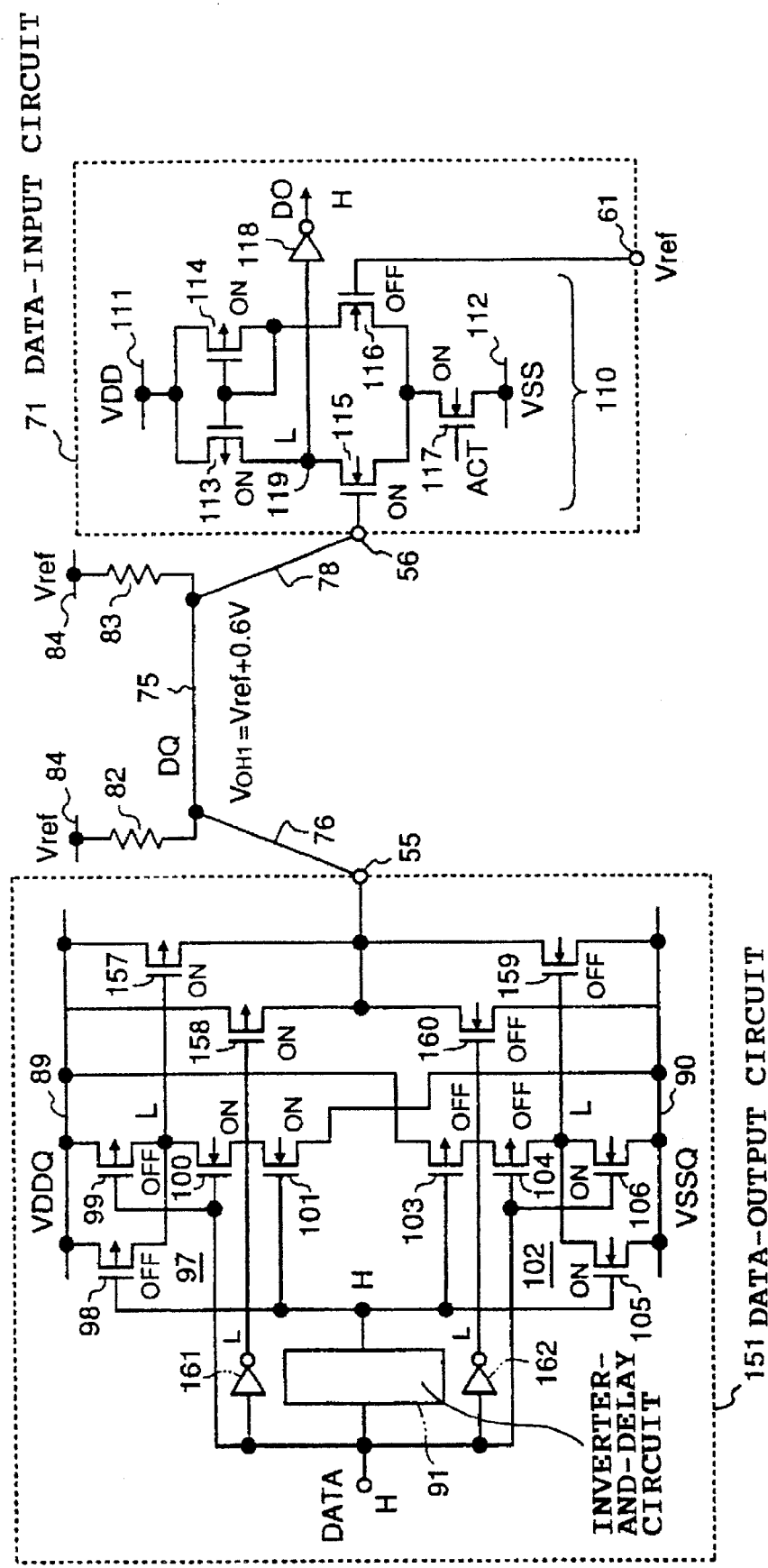

And then, as shown in FIG. 20, if the level of the data DATA becomes the high level H, the output of the inverter-and-delay circuit 91 is maintained at the high level H until the given delay time passes.

As a result, in the NAND circuit 97, the PMOS transistor 99 is turned off, and the NMOS transistor 100 is turned on. Therefore, the output level of the NAND circuit 97 becomes the low level L, and then, the PMOS transistor 157 is turned on.

And the output level of the inverter circuit 161 becomes the low level L, and the PMOS transistor 158 is turned on.

On the other hand, in the NOR circuit 102, the PMOS transistor 104 is turned off, and the NMOS transistor 106 is turned on. Therefore, the output of the NOR circuit 102 is maintained at the low level L, and the NMOS transistor 159 is maintained to be turned off.

And the output of the inverter circuit 162 becomes the low level L, and the NMOS transistor 160 is turned off.

In this case, an amount of current is drawn from the VDDQ power-supply line 89 to the reference-voltage line 84 through the PMOS transistors 157, 158, the stub 76, the bus line 75, and the terminating resistances 82, 83.

As a result, the voltage of the bus line 75 transits to a voltage determined by a combined resistance value of the turned-on PMOS transistors 157, 158 and the combined value of the terminating resistances 82, 83. In the third embodiment, resistance values of the turned-on PMOS transistors 157, 158 are previously set such that the level of the bus line 75 becomes the level $V_{OH1}$ which is decided to be the logic high, for example, (Vref+0.6 V).

In the data-input circuit 71, the NMOS transistors 115, 117 are turned on, the NMOS transistor 116 is turned off, the level of the node 119 is at the low level L, and the output DO of the inverter circuit 118 is at the high level H. In this way, the data DQ output from the data-output circuit 151, which indicates the high level H, is taken to the data-input circuit 71.

Figure 21:
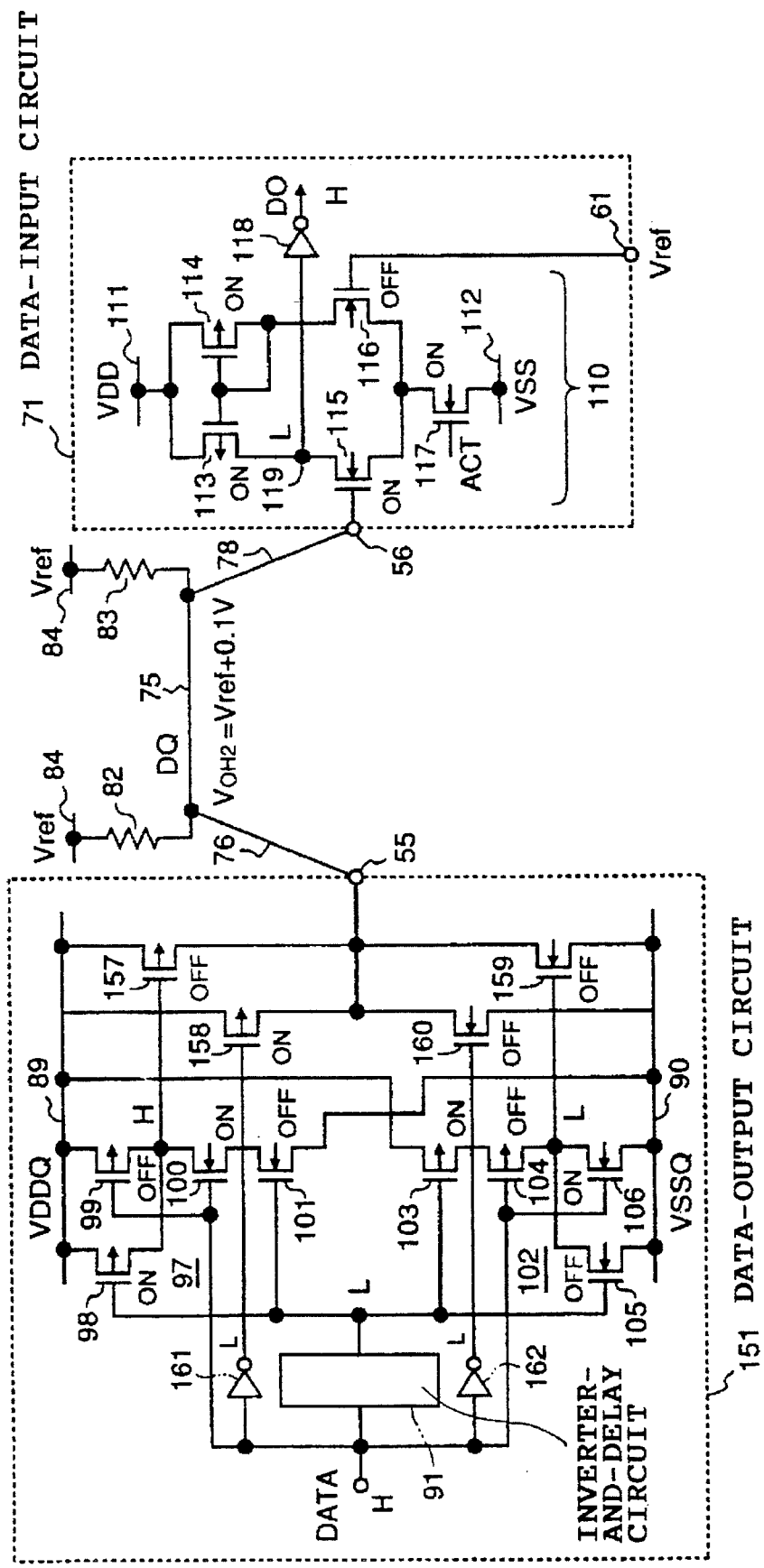

After that, as shown in FIG. 21, the output level of the inverter-and-delay circuit 91 becomes the low level L. As a result, in the NAND circuit 97, the PMOS transistor 98 is turned on, the NMOS transistor 101 is turned off, the output level of the NAND circuit 97 becomes the high level H, and the PMOS transistor 157 is turned off.

On the other hand, in the NOR circuit 102, the PMOS transistor 103 is turned on, the NMOS transistor 105 is turned off, the output of the NOR circuit 102 is maintained at the low level L, and the NMOS transistor 159 is maintained to be turned off.

In this case, an amount of current is drawn from the VDDQ power-supply line 89 to the reference-voltage line 84 through the PMOS transistor 158, the stub 76, the bus line 75 and the terminating resistances 82, 83.

As a result, the voltage of the bus line 75 transits to a voltage determined by a resistance value of the turned-on PMOS transistor 158 and the combined value of the terminating resistances 82, 83. In the third embodiment, the resistance value of the turned-on PMOS transistor 158 is previously set such that the level of the bus line 75 becomes the level $V_{OH2}$ which is less than the level $V_{OH1}$, but is decided to be the logic high, for example, (Vref+0.1 V).

In this case, in the data-input circuit 71, the threshold voltage $V_{IH}$ in the high-level side for the input is preset to (Vref+0.1 V), so that the output condition of the data-input circuit 71 does not change.

Figure 22:
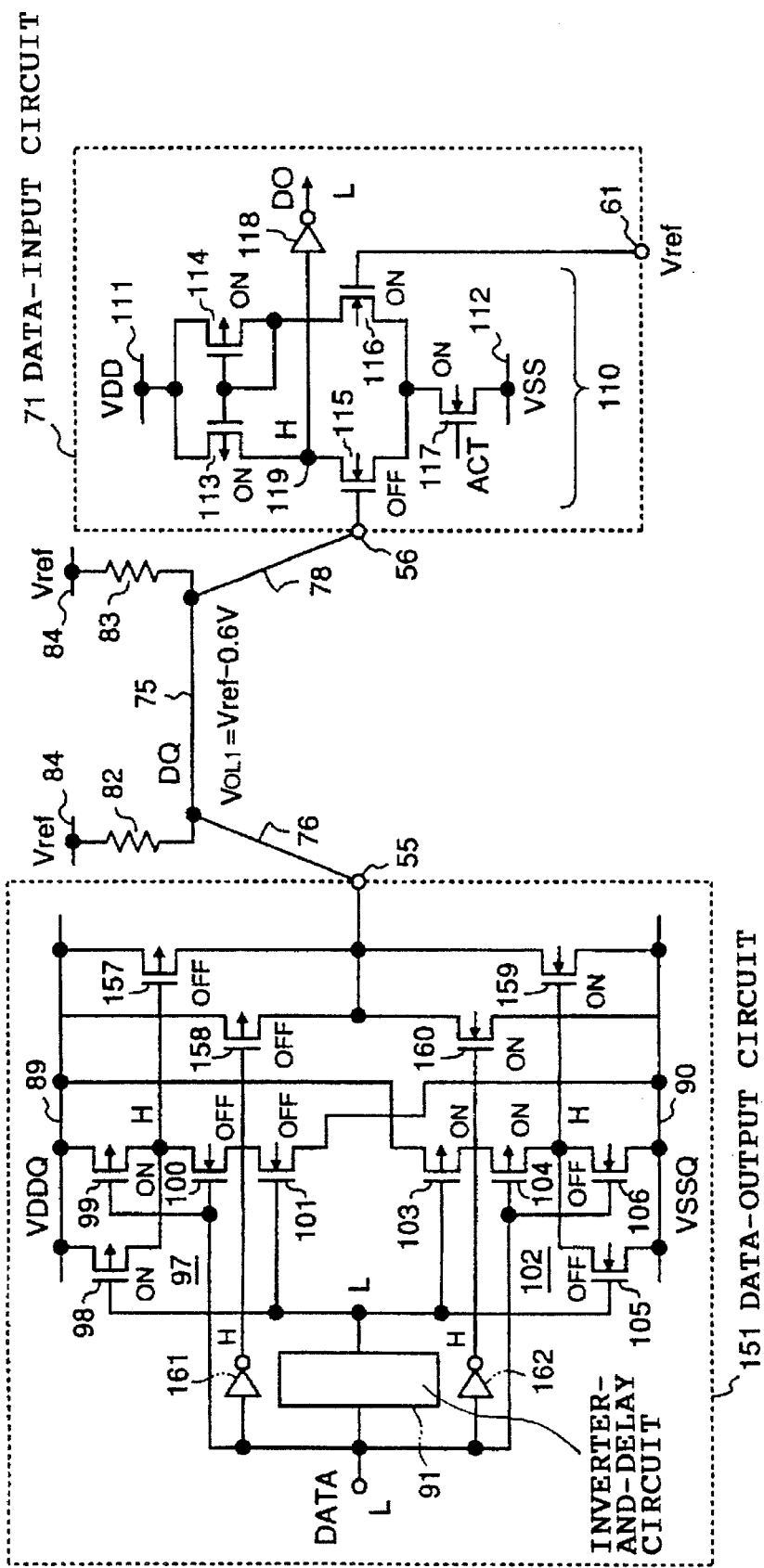

And then, as shown in FIG. 22, if the data DATA becomes the low level L, the output of the inverter-and-delay circuit 91 is maintained at the low level L until the given delay time passes.

As a result, in the NAND circuit 97, the PMOS transistor 99 is turned on, and the NMOS transistor 100 is turned off. Therefore, the output of the NAND circuit 97 is maintained at the high level H, and the PMOS transistor 157 is maintained to be turned off.

And the output level of the inverter circuit 161 becomes the high level H, and the PMOS transistor 158 is turned off.

On the other hand, in the NOR circuit 102, the PMOS transistor 104 is turned on, and the NMOS transistor 105 is turned off. Therefore, the output level of the NOR circuit 102 becomes the high level H, and then, the NMOS transistor 159 is turned on.

And the output of the inverter circuit 162 becomes the high level H, and the NMOS transistor 160 is turned on.

In this case, an amount of current is drawn from the reference-voltage line 84 to the VSSQ power-supply line 90 through the terminating resistances 82, 83, the bus line 75, the stub 76, and the NMOS transistors 159, 160.

As a result, the voltage of the bus line 75 transits to a voltage determined by a combined resistance value of the NMOS transistors 159, 160 and the combined value of the terminating resistances 82, 83. In the third embodiment, the resistance values of the turned-on NMOS transistors 159, 160 are previously set such that the level of the bus line 75 becomes the level $V_{OL1}$ which is decided to be the logic low, for example, (Vref−0.6 V).

In the data-input circuit 71, the NMOS transistor 116, 117 are turned on, the NMOS transistor 115 is turned off, the level of the node 119 is at the high level H, and the output DO of the inverter circuit 118 is at the low level L. In this way, the data DQ output from the data-output circuit 151, which indicates the low level L, is taken to the data-input circuit 71.

Figure 23:
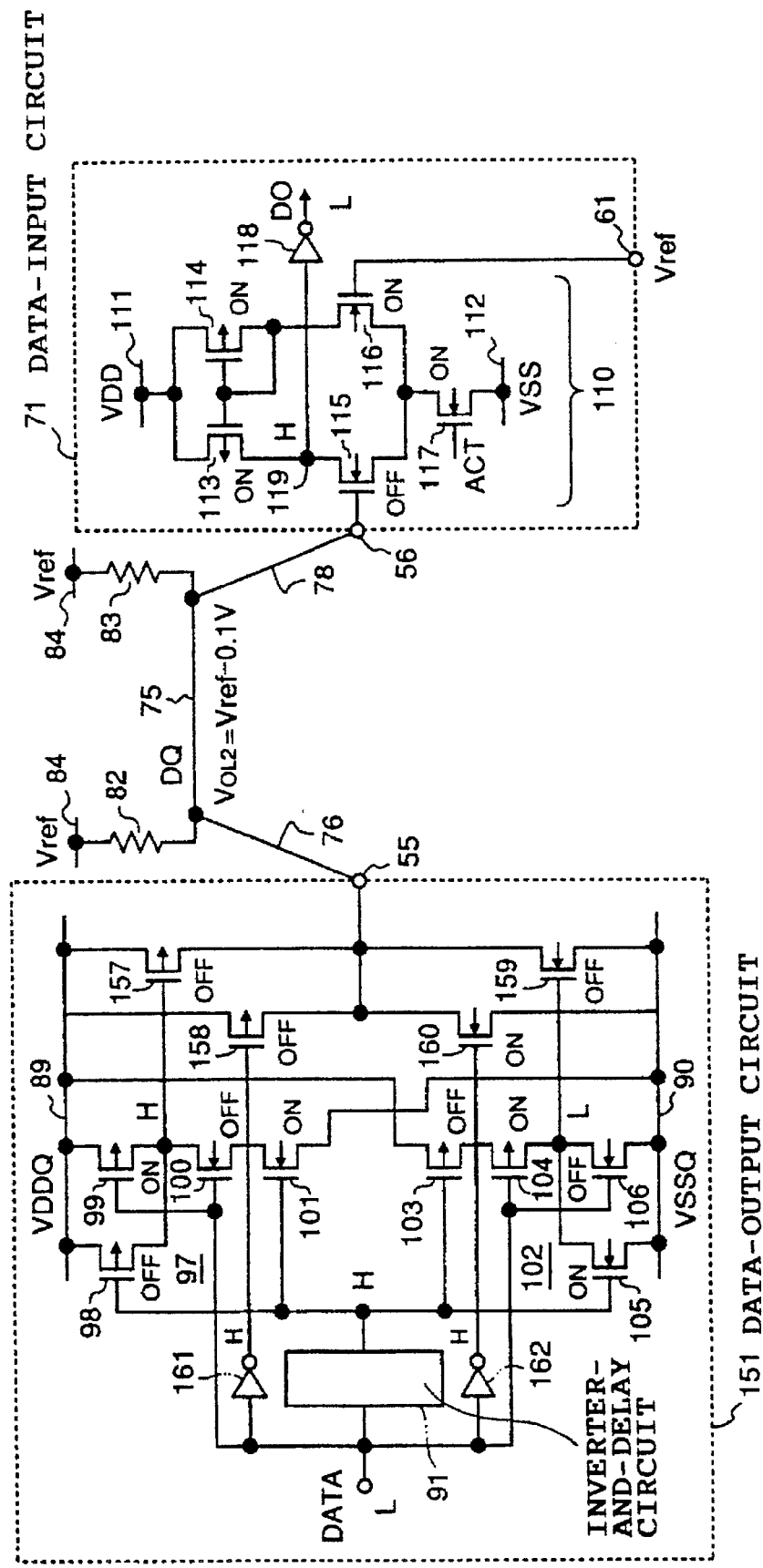

After that, as shown in FIG. 23, the output level of the inverter-and-delay circuit 91 becomes the high level H. As a result, in the NAND circuit 97, the PMOS transistor 98 is turned off, the NMOS transistor 101 is turned on, the output level of the NAND circuit 97 is maintained at the high level H, and the PMOS transistor 157 is maintained to be turned off.

On the other hand, in the NOR circuit 102, the PMOS transistor 103 is turned off, the NMOS transistor 105 is turned on, the output level of the NOR circuit 102 becomes the low level L, and then, the NMOS transistor 159 is turned off.

In this case, an amount of current is drawn from the reference-voltage line 84 to the VSSQ power-supply line 90 through the terminating resistances 82, 83, the bus line 75, the stub 76, and the NMOS transistor 160.

As a result, the voltage of the bus line 75 transits to a voltage determined by a resistance value of the turned-on NMOS transistor 160 and the combined value of the terminating resistances 82, 83. In the third embodiment, the resistance value of the turned-on NMOS transistor 160 is previously set such that the level of the bus line 75 becomes the level $V_{OL2}$ which is higher than the level $V_{OL1}$, but is decided to be the logic low, for example, (Vref−0.1 V).

As described above, in the third embodiment, when the data DQ of the low-level signal is output and the level of the bus line 75 becomes the level $V_{OL1}$(=Vref−0.6 V), in the standby mode after that, the level of the bus line 75 is maintained to the level $V_{OL2}$(=Vref−0.1 V).

And, when the data DQ of the high-level signal is output and the level of the bus line 75 becomes the level $V_{OH1}$(= Vref+0.6 V), in the standby mode after that, the level of the bus line 75 is maintained at the level $V_{OH2}$(=Vref+0.1 V).

Therefore, in the same way as the first embodiment, the third embodiment also may have the larger maximum acceptable reflection ratio than that of the conventional electronic device shown in FIG. 1. Thus, in the electronic device of the third embodiment, the large margin may be taken for the input/output specification, so that the above makes it easy to design the electronic device.

Further, as shown in FIG. 21, in the third embodiment, in the standby mode after the data DQ of the high-level signal has been output from the data-output circuit 151, the PMOS transistor 157 is turned off, and the PMOS transistor 158 is turned on. Thus, an amount of the current supplied to the bus line 75 may be reduced.

Also in the case that the data DQ of the high-level signal is output from the data-output circuits 152 to 155, in the same way as mentioned above, the amount of the current supplied to the bus line 75 may be reduced.

And when the data DQ of the low-level signal is output from the data-output circuit 151 as shown in FIG. 23, the NMOS transistor 159 is turned off, and the NMOS transistor 160 is turned on, thus an amount of current drawn from the bus line 75 may be reduced.

Further, also in the case that the data DQ of the low-level signal is output from the data-output circuits 152 to 155, in the same way as mentioned above, the amount of the current drawn from the bus line 75 may be reduced.

Therefore, the third embodiment of the electronic device may reduce the power consumption in the standby mode compared to that of the conventional electronic device, in the same way as the first embodiment.

Further, the present invention is not limited to these embodiments, but various variations and modifications may be made without departing from the scope of the present invention.

What is claimed is:

1. A transmission-line-voltage control circuit for controlling a level of a transmission line, a signal of a first level indicating a logic high and a signal of second level indicating a logic low being supplied to the transmission line, the transmission-line-voltage control circuit comprising:

a comparing means for comparing said signal supplied to the transmission line to a reference voltage value;

a circuit means, connected to the transmission line, for supplying a transmission signal to said transmission line and for reducing, after said signal of the first level is supplied to the transmission line and compared to said reference voltage value, the level of said transmission line to a third level which indicates the logic high and is less than the first level, and for increasing, after said signal of the second level is supplied to the transmission line and compared to the reference voltage value, the level of the transmission line to a fourth level which indicates the logic low and is higher than the second level, wherein when the transmission signal in the transmission line transits to another logic level, said transmission signal transits from said third level to said second level and from said fourth level to said first level and, wherein said circuit means latches the level of said transmission line.

2. The transmission-line-voltage control circuit as claimed in claim 1, wherein said circuit means comprises a latch circuit, connected to the transmission line, for latching said level of the transmission line.

3. The transmission-line-voltage control circuit as claimed in claim 2, wherein said latch circuit comprises a first gate circuit and a second gate circuit which are connected in a form of a flip-flop.

4. An electronic device for controlling a level of a transmission line, a signal of a first level indicating a logic high and a signal of a second level indicating a logic low being supplied to the transmission line, said electronic device comprising:

a comparing means for comparing said signal supplied to the transmission line to a reference voltage value;

at least one electronic circuit means for supplying a transmission signal to the transmission line; and a transmission-line-voltage control circuit for reducing, after said signal of the first level is supplied to the transmission line and compared to said reference voltage value, the level of said transmission line to a third level which indicates the logic high and is less than the first level, and for increasing, after said signal of the second level is supplied to the transmission line and compared to the reference voltage value, the level of the transmission line to a fourth level which indicates the logic low and is higher than the second level, wherein when the transmission signal in the transmission line transits to another logic level, said transmission signal transits from said third level to said second level and from said fourth level to said first level, and wherein said control circuit latches the level of said transmission line.

5. The electronic device as claimed in claim 4, wherein said transmission-line-voltage control circuit comprises a latch circuit including a first gate circuit and a second gate circuit which are connected in a form of a flip-flop.

6. An electronic device for supplying a signal of a first level indicating a logic high and a signal of a second level indicating a logic low to a transmission line, said electronic device comprising:

a comparing means for comparing said signal supplied to the transmission line to a reference voltage value;

a circuit means for supplying a transmission signal to said transmission line and for reducing, after supplying said signal of the first level to the transmission line and being compared to said reference voltage value, a level of said transmission line to a third level which indicates the logic high and is less than the first level, and for increasing, after supplying said signal of the second level of the transmission line and being compared to said reference voltage value, the level of the transmission line to a fourth level which indicates the logic low and is higher than the second level, wherein when the transmission signal in the transmission line transits to another logic level, said transmission signal transits from said third level to said second level and from said fourth level to said first level, and wherein said circuit means latches the level of said transmission line.

7. The electronic device as claimed in claim 6, circuit means comprises:

a pull-up circuit provided with a first power-supply voltage, for reducing, after supplying said signal of the first level to the transmission line, a current supplied to the transmission line; and a pull-down circuit provided with a second power-supply voltage lower than said first power-supply voltage for reducing, after supplying said signal of the second level to the transmission line, a current drawn from the transmission line.

8. The electronic device as claimed in claim 7, wherein:

said pull-up circuit comprises a plurality of first transistors, each having an electrode connected to said first power-supply voltage, an electrode connected to an output, and a control electrode;

said pull-down circuit comprises a plurality of second transistors, each having an electrode connected to said second power-supply voltage, an electrode connected to said output, and a control electrode;

said plurality of the first transistors are controlled to be conductive and said plurality of the second transistors are controlled to be non-conductive to supply said signal of the first level to the transmission line, and after supplying said signal of the first level to the transmission line, at least one transistor of said plurality of the first transistors is controlled to be non-conductive; and said plurality of the first transistors are controlled to be non-conductive and said plurality of the second transistors are controlled to be conductive to supply said signal of the second level to the transmission line, and after supplying said signal of the second level to the transmission line, at least one transistor of said plurality of the second transistors is controlled to be non-conductive.

9. An electronic device comprising:

a transmission line for transmitting signals;

at least one signal-output circuit supplying a signal of a first level indicating a logic high and a signal of a second level indicating a logic low to the transmission line;

at least one signal-input circuit receiving said signal of the first level and said signal of the second level from the transmission line;

and comparing said signal of the first level to a reference voltage value; and a transmission-line-voltage control circuit, connected to the transmission line, for reducing, after said signal of the first level is supplied to the transmission line and compared to said reference voltage value, a level of said transmission line to a third level which indicates the logic high and is less than the first level, and for increasing, after said signal of the second level is supplied to the transmission line and compared to said reference voltage value, the level of the transmission line to a fourth level which indicates the logic low and is higher than the second level, wherein when the transmission signal in the transmission line transits to another logic level, said transmission signal transits from said third level to said second level and from said fourth level to said first level, and wherein said control circuit latches the level of said transmission line.

10. The electronic device as claimed in claim 9, wherein said transmission-line-voltage control circuit comprises a latch circuit including a first gate circuit and a second gate circuit which are connected in a form of a flip-flop.

11. The electronic device as claimed in claim 9, wherein said transmission line comprises a bus line.

12. The electronic device as claimed in claim 9, wherein said at least one signal-input circuit comprises decision means for comparing a received signal with a reference voltage and deciding whether the received signal is the logic high or the logic low.

13. The electronic device as claimed in claim 10, wherein said at least one signal-output circuit controls its own output condition to be a high impedance after supplying a signal.

14. An electronic device comprising:

a transmission line for transmitting signals; and at least one signal-output circuit supplying a signal of a first level indicating a logic high and a signal of a second level indicating a logic low to the transmission line, said signal-output circuit including a transmission-line-voltage control circuit, connected to the transmission line, for reducing, after said signal of the first level is supplied to the transmission line, a level of said transmission line to a third level which indicates the logic high and is less than the first level, and for increasing, after said signal of the second level is supplied to the transmission line, the level of the transmission line to a fourth level which indicates the logic low and is higher than the second level; and at least one signal-input circuit receiving said signal of the first level and said signal of the second level from the transmission line, wherein said control circuit latches the level of said transmission line.

15. The electronic device as claimed in claim 14, wherein said transmission-line-voltage control circuit comprises a latch circuit including a first gate circuit and a second gate circuit which are connected in a form of a flip-flop.

16. An electronic device comprising:

a transmission line for transmitting signals; and at least one signal-output circuit supplying a signal of a first level indicating a logic high and a signal of a second level indicating a logic low to the transmission line one signal-input circuit said at least one signal-output circuit including a transmission-line-voltage control circuit, connected to the transmission line, for reducing, after said signal of the first level is supplied to the transmission line, a level of said transmission line to a third level which indicates the logic high and is less than the first level, and for increasing, after said signal of the second level is supplied to the transmission line, the level of the transmission line to a fourth level which indicates the logic low and is higher than the second level, wherein said control circuit latches the level of said transmission line.

17. The electronic device as claimed in claim 16, wherein said transmission-line-voltage control circuit comprises a latch circuit including a first gate circuit and a second gate circuit which are connected in a form of a flip-flop.

18. An electronic device comprising:

a transmission line for transmitting signals;

at least one signal-output circuit supplying a signal of a first level indicating a logic high and a signal of a second level indicating a logic low to the transmission line said signal-output circuit including means for reducing, after supplying said signal of the first level to the transmission line, a level of said transmission line to a third level which indicates the logic high and is less than the first level, and for increasing, after supplying said signal of the second level to the transmission line, the level of the transmission line to a fourth level which indicates the logic low and is higher than the second level; and at least one signal-input circuit receiving said signal of the first level and said signal of the second level from the transmission line, and comparing said signal to a reference voltage value wherein when the transmission signal in the transmission line transmits to another logic level, said transmission signal transits from said third level to said second level and from said fourth level to said first level, and wherein said circuit latches the level of said transmission line.

19. The electronic device as claimed in claim 18, wherein said circuit means comprises:

a pull-up circuit, provided with a first power-supply voltage, for reducing, after supplying said signal of the first level to the transmission line, a current supplied to the transmission line; and a pull-down circuit, provided with a second power-supply voltage lower than said first power-supply voltage, for reducing, after supplying said signal of the second level to the transmission line, a current drawn from the transmission line.

20. The electronic device as claimed in claim 19, wherein:

said pull-up circuit comprises a plurality of first transistors, each having an electrode connected to said first power-supply voltage, an electrode connected to an output, and a control electrode;

said pull-down circuit comprises a plurality of second transistors, each having an electrode connected to said second power-supply voltage, and electrode connected to said output, and a control electrode;

said plurality of the first transistors are controlled to be conductive and said plurality of the second transistors are controlled to be non-conductive to supply said signal of the first level to the transmission line, and after supplying said signal of the first level to the transmission line, at least one transistor of said plurality of the first transistors is controlled to be non-conductive; and said plurality of the first transistors are controlled to be non-conductive and said plurality of the second transistors are controlled to be conductive to supply said signal of the second level to the transmission line, and after supplying said signal of the second level to the transmission line, at least one transistor of said plurality of the second transistors is controlled to be non-conductive.

* * * * *